US012767427B2

(12) United States Patent
Van De Sluis et al.

(10) Patent No.: US 12,767,427 B2
(45) Date of Patent: Oct. 20, 2026

(54) CARTRIDGE FOR PROVIDING A LIQUID PRODUCT, A SYSTEM FOR THE PROVIDING A LIQUID PRODUCT AND A METHOD USING SAID SYSTEM

(71) Applicant: Apiqe Holdings, LLC, Torrance, CA (US)

(72) Inventors: Jasper Jacobus Van De Sluis, Le Utrecht (NL); Mattheus Pieter Both, EE Apeldoorn (NL)

(73) Assignee: Apiqe Holdings, LLC, Torrance, CA (US)

( * ) Notice: Subject to any disclaimer, the term of this patent is extended or adjusted under 35 U.S.C. 154(b) by 902 days.

(21) Appl. No.: 17/926,484

(22) PCT Filed: May 18, 2021

(86) PCT No.: PCT/EP2021/063179
§ 371 (c)(1),
(2) Date: Nov. 18, 2022

(87) PCT Pub. No.: WO2021/233931
PCT Pub. Date: Nov. 25, 2021

(65) Prior Publication Data

US 2023/0182994 A1 Jun. 15, 2023

(30) Foreign Application Priority Data

May 18, 2020 (NL) ...................................... 2025604

(51) Int. Cl.
*B65D 53/00* (2006.01)
*A23L 2/54* (2006.01)
*B65D 85/804* (2006.01)

(52) U.S. Cl.
CPC ............ *B65D 85/8055* (2020.05); *A23L 2/54* (2013.01)

(58) Field of Classification Search
CPC ...... A23L 2/54; A23L 2/00; C12G 3/04; A47J 31/3628; A47J 31/3695; B65D 85/804; B65D 85/8043
See application file for complete search history.

(56) References Cited

U.S. PATENT DOCUMENTS 11,390,454 B2 7/2022 Glaesser et al.
2010/0064899 A1 3/2010 Aardenburg
2010/0239734 A1 * 9/2010 Yoakim et al. ......... A47J 31/44 426/433

FOREIGN PATENT DOCUMENTS

DE 102017213368 A1 2/2019
EP 2942312 A1 * 11/2015 ......... B65D 85/8061
(Continued)

OTHER PUBLICATIONS

Machine translation of WO 2011138405 A1 performed on Sep. 17, 2025, Hother et al. (Year: 2011).*
(Continued)

*Primary Examiner* — Ibrahime A Abraham
*Assistant Examiner* — Kevin Guanhua Wen
(74) *Attorney, Agent, or Firm* — BLANK ROME LLP

(57) ABSTRACT

The invention relates to a single use, or disposable cartridge, wherein the cartridge is provided with a capsule (2) in the form of a sealed reservoir. The reservoir is defined by a capsule body (5) that allows for use of muti-layer materials. Thus, the cartridge, more in particular the capsule body of the cartridge, can be provided with barrier properties that suit the ingredient held in the reservoir. As such, the cartridge is configured to provide a capsule, more in particular a sealed reservoir, for holding an ingredient, which capsule has barrier properties that fit the particular base ingredient to be held in the reservoir.

21 Claims, 14 Drawing Sheets

(56) References Cited

FOREIGN PATENT DOCUMENTS

| | | | | | |
|---|---|---|---|---|---|
| JP | 2015502230 | A1 | * | 1/2015 | ......... B65D 85/8043 |
| RU | 2633265 | C2 | * | 10/2017 | ............ A47J 31/407 |
| WO | WO-2007114685 | A1 | * | 10/2007 | ........... B67D 1/0021 |
| WO | WO-2011138405 | A1 | * | 11/2011 | ......... B65D 85/8049 |
| WO | WO-2012/125032 | A2 | | 9/2012 | |
| WO | WO-2013132450 | A1 | * | 9/2013 | ......... B65D 85/8052 |
| WO | WO-2016081480 | A2 | * | 5/2016 | ............ A47J 31/407 |
| WO | WO-2017/068535 | A1 | | 4/2017 | |
| WO | WO-2017/137460 | A1 | | 8/2017 | |

OTHER PUBLICATIONS

Machine translation of JP 2015502230 A1 performed on Sep. 18, 2025, Gugelli (Year: 2015).*
Machine translation of RU 2633265 C2 performed on Sep. 18, 2025, Shalev (Year: 2017).*
Machine translation of EP 2942312 A1 performed on Sep. 19, 2025, Alberti (Year: 2015).*
International Search Report and Written Opinion for PCT/EP2021/063179, dated Jul. 6, 2021, 14 pages.
Search Report for NL2025604, 12 pages.

* cited by examiner

CARTRIDGE FOR PROVIDING A LIQUID PRODUCT, A SYSTEM FOR THE PROVIDING A LIQUID PRODUCT AND A METHOD USING SAID SYSTEM

RELATED APPLICATIONS

This application is a national phase of PCT/EP2021/063179, filed on May 18, 2021, which claims priority to Netherlands Patent Application No. 2025604, filed on May 18, 2020.

FIELD AND BACKGROUND OF THE INVENTION

This invention relates to a cartridge for providing a liquid product and a method for providing such a cartridge.

A cartridge for providing a liquid product is for example known from WO2016081480 The publication discloses a disposable cartridge filled with a portion of a liquid ingredient to be combined with a base liquid for the preparation of a liquid product, in particular a beverage concentrate to be combined with carbonated water for the preparation of a beverage.

The cartridge is provided with dispensing passages having outlet apertures located adjacent a central channel outlet for dispensing a base liquid. The cartridge enables the liquid ingredient and the base liquid to be dispensed in parallel flows. Actual mixing of the liquid ingredient and base liquid only takes place after both have been dispensed.

The cartridge is in particular suited for being made by injection moulding. This allows for a simple and quick production process.

A drawback of injection moulded cartridges is that the barrier properties of injection moulded plastic are not optimal for all food products. Also, the injection moulding technique is difficult to combine with providing products comprising multi-layer material, i.e. products having walls that comprise multiple layers of different materials. Thus, the injection moulding process is not optimal for providing cartridges having a reservoir with barrier products dedicated to the ingredient to be held in the reservoir.

A cartridge for preparing coffee is known from US2010064899. The cartridge comprises a cartridge body defining a reservoir and a top seal sealing an entry to the reservoir. Coffee powder is packaged in an aroma-tight manner in the reservoir and is protected against moisture. The top seal is to be pierced to enable water to enter the reservoir. To enable the coffee to flow from the reservoir, the bottom of the capsule is pierced with an external piercing device.

The capsule body may be produced by deep drawing a laminate material, and thus allows for providing the cartridge with barrier properties dedicate of the production be held in the capsule. However, the cartridge is of a simple design, i.e. comprises no dispensing passages or channels to guide flows of liquid, but simple outflow openings only. Furthermore, an external piercing device are required for opening the reservoir.

It is an object of the invention to provide an alternative cartridge for providing a liquid product, in particular a cartridge for providing a beverage product by dispensing a base liquid and a liquid ingredient in parallel flows. It is a further object of the invention to provide an improved cartridge, that is a cartridge in which one or more of the above mentioned drawbacks are eliminated altogether or occur in a greatly reduced extent. In particular, it is an object of the first aspect of the invention to provide a cartridge comprising a multi-layer capsule body, i.e. a capsule body comprising walls with multiple layers of different materials, for holding a liquid ingredient.

One or more of the above mentioned objects is achieved by providing a cartridge according to the claims.

A cartridge for providing a liquid product according to the invention comprises:

- a sealed capsule filled with a portion of a liquid ingredient to be combined with a base liquid for the preparation of the liquid product, e.g. a beverage concentrate to be combined with water, e.g. carbonated water, for the preparation of a beverage, wherein the sealed capsule comprises:
  - a, preferably thermoformed, capsule body with a bottom and a top, the capsule body comprising an outer circumferential wall, an inner circumferential wall and a bottom wall, the walls delimiting an annular reservoir between them, wherein the walls of the capsule body preferably comprise multiple layers of different materials, the materials having different barrier properties;
- wherein the inner circumferential wall and the outer circumferential wall at a top end are respectively provided with an inner sealing surface and an outer sealing surface, the sealing surfaces delimiting a reservoir access opening between them,
- wherein the inner circumferential wall forms a column, the column having an internal cavity that extends between an upper opening, preferably encircled by the inner sealing surface, at a top of the column and a bottom opening at a bottom end of the column, and wherein the bottom wall of the capsule body is provided with at least one reservoir outlet in the form of an aperture, or in the form of a pierceable bottom area; and
  - a top seal, e.g. a top sealing film, sealed to the inner sealing surface and the outer sealing surface and covering the reservoir, the top seal hermetically sealing the access opening of the reservoir,
- wherein the cartridge further comprises:
- a nozzle for guiding a flow of base liquid through at least part of the cavity, and for dispensing the base liquid at a bottom side of the capsule, wherein the nozzle comprises:
  - a nozzle body having a channel extending between an inlet opening at a top end of the nozzle and an outlet opening at a bottom end of the nozzle, which nozzle is received in the cavity of the column, and
- wherein the nozzle is moveable, relative to the outer circumferential wall of the capsule body, from a raised passive position into a lowered dispensing position.

According to the claimed invention, the cartridge comprises a capsule body having an outer wall, an inner wall and a bottom wall, the capsule body defining an annular reservoir between these walls. As such, the capsule body as a simple shape.

The inner wall of the capsule body forms a column. The capsule is configured such that the top end of the column can be pushed downward relative to the outer wall of the capsule. The cartridge is configured such that this movement of the top end of the column opens the capsule, more in particular causes a seal to be removed and/or a bottom area to be pierced.

The capsule body having a simple shape allows for the walls of the capsule to be provided as a multi-layer material, and thus allows for a capsule body having improved barrier properties against low costs.

The simple shape of the capsule body allows for adding barriers, for example by laminating the capsule body with a foil material having improved barrier properties. Also, materials can be added by way of spraying, to thus improve the barrier properties of the capsule body.

Furthermore, the simple shape of the capsule body is suitable for being provided by way of thermoforming. Thermoforming allows for using laminated materials, and thus provide a capsule body having improved barrier properties against low costs.

As such, the cartridge comprises a capsule, in the form of a sealed reservoir, for holding an ingredient. The reservoir, more in particular the capsule body, is configured to comprise multiple layers of different materials, to enable barrier properties that fit the particular base ingredient to be held in the reservoir. For example, a sheet comprising layers of Polyethylene and Polypropylene can be used to, by way of thermoforming, provide a capsule body with a double layer wall. The multi layered wall in combination with the seal sealing the reservoir opening, and optionally the seal sealing the reservoir outlet, thus for a capsule for containing the liquid ingredient, which capsule shields the liquid ingredient from its environment, and prevents, or at least reduces, migration of ingredients from the reservoir.

The capsule body has a centre column with a top end that can be pushed downward to open the capsule. The downward movement of the top end of the column pulls the outflow aperture and the bottom seal away from each other, or makes a bottom piercer pierce the pierceable area at the outflow aperture.

Thus, a simple pushing movement opens the capsule and enables use of the liquid ingredient. The capsule therefore does not require an external piercing device for opening the capsule.

The cartridge according to the claimed invention preferably is a single use, or disposable cartridge, i.e. the contents of the cartridge are used for providing a single beverage. After the cartridge has been emptied, it is to be disposed of by the user.

The cartridge is configured to comprise a limited amount of different materials, to enable recycling of the materials after use of the cartridge. It is submitted that the design of the cartridge allows for a capsule body comprising barrier properties that relate to the liquid ingredient to be stored in the reservoir of the capsule, while still enabling recycling of the cartridge, in particular the capsule body of the cartridge.

In an embodiment, the column is a collapsible column, i.e. the inner circumferential wall is configured to buckle when the top end of the column is pressed downwards towards the bottom end of the column. The wall of the column is for example provided with an annular shaped buckle portion, comprising a web of triangular shaped areas that promote local collapse of the column.

In such an embodiment, a moveable nozzle or a moveable bottom piercer is provided to pull the bottom seal away from the outflow aperture, or to pierce the bottom wall to provide the outflow aperture Due to the column being a collapsible column, only part of the capsule body has to be moved to open the capsule. Thus, the rest of the capsule body can be design more rigid, which provides a shockproof capsule body.

In an alternative embodiment, the column is a moveable column, i.e. the bottom wall has an annular flexible bottom portion around the column that enables the column to be moved downwards from an initial position to a lower operative position relative to the outer circumferential wall.

In such an embodiment, a bottom seal is provided inside the reservoir. The bottom seal has an inner end sealing the outflow aperture and an outer end fixed in position relative to the outer circumferential wall. Moving the top end of the column relative to the circumferential wall initiates pealing the bottom seal from the outflow aperture by moving an inner section of the bottom wall, comprising the outflow aperture, downward relative to the outer circumferential wall.

The invention furthermore provides a cartridge in which the column is fixed, and in the fixed column is provided a nozzle that can be moved, relative to the column, from a raised passive position into a lowered dispensing position. With such a cartridge, the nozzle can be pushed downward to open the capsule. The downward movement of the nozzle pulls a bottom seal away from a outflow aperture in the bottom of the capsule body.

According to the claimed invention, the capsule comprises an inside and an outside wall, i.e. an inner circumferential wall and an outer circumferential wall, and a bottom wall extending between a bottom end of the inner circumferential wall and a bottom end of the outer circumferential wall. The inner circumferential wall forms a column. The top end of the inner circumferential wall and the top end of the outer circumferential wall form sealing surfaces for attaching the top seal to the capsule body.

Pushing down the top end of the column causes the nozzle to be pushed in a downward direction as well.

In an embodiment, the column is a collapsible column, i.e. the inner circumferential wall is configured to buckle when the top end of the column is pressed downwards towards the bottom end of the column. In an embodiment, the cartridge is configured to cooperate with a dispensing apparatus, in particular a feed lance for dispensing water of a dispensing apparatus. In such an embodiment, the feed lance engages the top end of the column, and may at the same time partially penetrate the channel of the column.

In an alternative embodiment, the column is a moveable column, i.e. the bottom wall has an annular flexible bottom portion around the column that enables the column to be moved downwards from an initial position to a lower operative position relative to the outer circumferential wall.

The one or more outflow openings, or pierceable areas for forming the outflow openings, are preferably provided at the inner circumferential wall, or at least spaced from the outside wall, in particular when the bottom wall is a flexible wall that enables the column to be moved relative to the outside wall.

In a further embodiment, the column is configured to both buckle and be moved in its entirety. In such an embodiment, pushing the top end of the column downward first causes the column to buckle and, enabling the top end of the column to be moved downward while the bottom end of the column is stationary relative to the outside wall of the capsule, and subsequently causes the bottom part of the column to be also moved in the downward direction.

In an embodiment, the top end of the column engages the top end of the nozzle, either directly or after being moved over an initial distance, such that the top end and nozzle move together in the downward direction.

In an alternative embodiment the nozzle is fixed to the bottom wall of the capsule or is fixed to a bottom portion of the column. In such an embodiment, the column is a moveable column.

The nozzle is provided to combine the flow of water, dispensed through the capsule, with the flow of ingredient, released from the reservoir. Furthermore, by providing a nozzle, a feed lance can dispense the water via the nozzle, without the feed lance contacting the ingredient. Thus, there is no need for cleaning the nozzle. Also, there is no risk of cross contamination between different capsules, i.e. ingredient of one cartridge being mixed with ingredient of a previously used.

The nozzle comprises a central channel to guide the flow of water. Preferably, the cartridge is configured to dispense the ingredient from the reservoir along the outside of the channel, such that the ingredient and the water are dispensed as parallel flows below the nozzle.

The nozzle is received in the column, and is moveable relative to the outer circumferential wall.

In an embodiment, the nozzle is fixed to the column, and is moved with, part of, the column relative to the circumferential wall. For example, in an embodiment, the column is a collapsible column, and the nozzle is coupled with the top end of the column.

In an alternative embodiment, the column is a moveable column, i.e. is coupled with a flexible bottom, and can thus be moved relative to the outer wall in its entirety. In such an embodiment, the nozzle may be fixed to the bottom end of the column, or to the bottom wall of the capsule.

In an alternative embodiment, the nozzle is moveable within the channel of the column, i.e. relative to the column. In such an embodiment, the nozzle is for example positioned and supported in the column by the bottom seal.

At its top end the nozzle is configured to receive a flow of water dispensed by for example a feed lance. In an embodiment, the nozzle is configured to be coupled with a feed lance, when the feed lance is inserted into the column. In an alternative embodiment, the nozzle is configured for receiving a flow of water, without the nozzle being coupled with the nozzle. In such an embodiment, the nozzle may have a funnel shaped top end for receiving a flow of water.

In an embodiment, the nozzle is provided with internal guide planes, that extend in a direction perpendicular to the inside surface of the channel of the nozzle and in a direction parallel to the flow of water that is dispensed by the nozzle, for dispensing a flow of water with minimal turbulence. Thus, the flow combines with a parallel flow of liquid ingredient, and the water better contains CO2. Preferably, the planes cross the channel and intersect at the centre of the channel. In an embodiment two intersecting guide planes are provided and in a cross sectional view of the channel the planes form an X.

In a preferred embodiment according to the invention, the cartridge is provided with a guide member. The guide member is provided below the bottom of the capsule body, and is configured to receive the liquid ingredient dispensed from the reservoir, and to guide the liquid ingredient to the nozzle, more in particular to a flow of base liquid, e.g. water, dispensed from the nozzle, to dispense the flow of liquid ingredient parallel, and preferably adjacent to, the flow of water dispensed via the nozzle.

In an embodiment, the nozzle comprises a flange and a bottom seal that together function as a guide member for guiding the liquid ingredient.

In such an embodiment, the bottom seal is at one end sealed to the nozzle and at an opposite end to the bottom wall of the capsule. Between those two ends, the seal covers at least one outflow aperture of the reservoir. Initially, the seal is furthermore sealed to the bottom wall of the capsule body around the outflow apertures of the reservoir, to thus seal the reservoir outlet.

In such an embodiment, the capsule is opened by pushing part of the nozzle out of the channel of the column of the capsule body, the nozzle thus pulling one end of the bottom seal away from the bottom wall of the capsule body, and thus opening the outflow apertures of the reservoir.

Subsequently, the seal, still being sealed to the bottom of the capsule at one end and a to the nozzle at an opposite end, functions as a guide or funnel, that receives the liquid ingredient dispensed from the reservoir, and subsequently guides the liquid ingredient to the outlet opening of the nozzle, i.e. the opening at which the base liquid is dispensed, such that the liquid ingredient can be dispensed parallel and adjacent to the flow of base liquid.

In an alternative embodiment, the capsule is provided with a guide member, fixed to the bottom wall of the capsule. In an embodiment, the guide member is an injection moulded component.

The guide member is configured for receiving liquid ingredient flowing from the reservoir outlet, towards and below the bottom opening of the column, to dispense the liquid ingredient at or adjacent the flow of base liquid exiting the outlet opening of the nozzle, when the nozzle is in the lowered dispensing position. Thus, by providing the guide body, the reservoir outlet can be spaced from to the flow of base liquid, while the ingredient can be dispensed alongside, preferably adhered to, the flow of base liquid. This is in particular beneficial when the cartridge is used in the a dispensing apparatus that utilises a pressurised gas, e.g. air, to urge the liquid ingredient, e.g. a syrup, from the reservoir, to be mixed with a base liquid, e.g. carbonated water. In such a system, the last bit of liquid ingredient may be followed by puff of pressurised gas from the reservoir outlet. In case the reservoir outlet is located in the vicinity of the nozzle, in particular in the vicinity of the flow of base liquid, the puff of pressurised gas may disturb the flow of base liquid. Especially when the base liquid is a flow of carbonated water such a disturbance of the flow may reduce the CO2 content of the flow.

The guide member has a fixed shape. For example, in an embodiment, the guide member comprises a guide member body. The guide member body comprises a guide surface for guiding the liquid ingredient and a central opening for receiving the bottom end of the nozzle. Furthermore, the guide member body is provided with one or more seal areas, e.g. a flange extending along the periphery of the guide member, at which the guide member body is sealed to the bottom wall of the capsule body.

It is submitted that the guide member body may be fixed to the capsule body for example by heat sealing or an alternative technique, for example by clamping a flange of the guide member body behind a rib or protrusions formed in the bottom wall of the capsule.

In a preferred embodiment, the central opening of the guide member is positioned in line with the nozzle, and is dimensioned such that when the nozzle is lowered relative to the outer wall of the capsule, the bottom end of the nozzle is received in the guide opening, and one or more apertures are present between the nozzle and the guide member body, for dispensing liquid ingredient at the nozzle.

Such a guide member preferably is, compared to the seal of the previous example, a relatively rigid component, for example has a rigidity similar to or is more rigid than the capsule body.

In yet another embodiment, the guide member is fixed to, preferably is an integral component of, the nozzle. In such an embodiment, the guide member moves with the nozzle, and is not fixed to the bottom wall of the capsule body.

In an embodiment, the guide member is fixed to the bottom wall of the capsule body, and is configured to position and support the nozzle in the channel of the column. In such a configuration, the capsule is provided with a flexible bottom, the bottom enabling the column, and the nozzle received in the column, to be pushed downward relative to the circumferential of the capsule.

In an alternative embodiment, the guide member is configured to remove the bottom seal from the reservoir outlet. In such an embodiment, the guide member is attached to the bottom of the capsule at or near the outer circumferential wall, such that the guide member is in a fixed position relative to the outer circumferential wall.

The guide member extends from below the at least one reservoir outlet, for receiving liquid ingredient flowing from the reservoir outlet, towards and below the bottom opening of the column, to dispense the liquid ingredient at or adjacent the flow of base liquid exiting the outlet opening of the nozzle, when the nozzle is in the lowered dispensing position, Furthermore, the guide member is provided with a rib element which extends in an upward direction towards a bottom seal attached to the bottom of the capsule body and to the nozzle, which nozzle is fixed inside a moveable column such that there is a gab adjacent the nozzle, which gab is covered by the seal extending between reservoir outlet and nozzle.

When the column is moved into the lower operative position, the rib element engages the bottom seal and is received in the gab. The seal, which is fixed to the nozzle and releasable attached to the bottom of the capsule, more in particular the capsule body, is pulled loose from the bottom of the capsule body and is partially pushed into the gab by the rib element. Thus, the rib element pulls the bottom seal away from the reservoir outlet to enable liquid ingredient to flow out of the reservoir outlet, and thus from the reservoir and the capsule.

In an embodiment, the capsule is provided with a diamond shaped seal. In such an embodiment, the capsule body is provided with two outflow openings in its bottom wall, which outflow openings are provided on opposite sides of the column, and with a diamond shaped bottom seal.

The bottom seal has a central opening, through which the bottom end of the nozzle may protrude. The seal is at its circumference sealed to the bottom of the capsule body, and along the central opening of the seal sealed to a flange of the nozzle. The seal is furthermore sealed to the bottom wall of the capsule body around the outflow apertures of the reservoir.

In such an embodiment, the capsule is opened by pushing part of the nozzle out of the channel of the capsule body, the nozzle thus pulling the centre of the bottom seal away from the bottom wall of the capsule body, and thus opening the outflow apertures of the reservoir.

Subsequently, the seal, still being sealed at its peripheral edge to the bottom of the capsule and along its central opening to the nozzle, functions as a guide for the liquid ingredient being dispensed from the reservoir. The seal guides the liquid ingredient to the outlet opening of the nozzle, i.e. the opening at which the water is dispensed, such that the liquid ingredient can be dispensed parallel and adjacent to the flow of water.

In such an embodiment, the nozzle is preferably provided with a flange at its bottom end, the flange providing an attachment surface for the seal and a dispensing aperture adjacent the central channel of the nozzle, for dispensing the liquid ingredient parallel to the flow of water dispensed via the channel of the nozzle.

It is submitted that the diamond shape of the seal, in combination with the two outflow openings of the reservoir, makes that the seal forms an optimal guide for the liquid ingredient. The diamond shape causes the seal to form to guide channels, directed from below the reservoir outflow apertures towards the nozzle. The surface of the seal is slanted towards the centre of the guide channels and towards the nozzle. Thus, all liquid ingredient is guided towards the dispense opening, and the risk of liquid ingredient remaining in the guide channels, i.e. not being dispensed, is reduced.

In an embodiment, the bottom seal is located inside the reservoir. In such an embodiment, the capsule is provided with a flexible bottom, more in particular is provided with a column that is movably supported by the bottom wall of the capsule.

The bottom wall of the capsule body is preferably provided with a corrugated portion, locally providing the bottom wall with flexibility, to enable an inner portion of the bottom wall to be pushed downward relative to a pouter portion of the bottom wall. Furthermore, the corrugated portion preferably enables some additional extension of the bottom wall, to thus enable the inner portion of the bottom wall to be pulled away from the outer portion of the bottom wall, when the inner portion is pushed downward relative to the outer portion of the bottom wall.

Furthermore, in such an embodiment, the seal extends from the peripheral outside of the bottom wall, i.e. the outer portion of the bottom wall at the outside wall of the capsule, to the peripheral inside of the bottom wall, i.e. the inner portion of the bottom wall at the inner circumferential wall of the capsule body.

At the peripheral outside, the seal is fixed, to an insert body in the capsule or to the capsule body, e.g. the bottom wall and/or the outside wall.

At the peripheral inside, the seal covers at least one outflow aperture of the reservoir, and is sealed to the bottom wall of the capsule to seal the at least one outflow aperture.

In such an embodiment, the capsule is opened by pushing the column of the capsule body downward relative to the circumferential outer wall of the capsule body, the nozzle thus pulling the bottom wall away from the seal, and thus opening the outflow apertures of the reservoir.

It is submitted that in such an embodiment, the bottom wall is thus not only configured to enable the column to be pushed in a downward direction, but is also provided with a buffer area, e.g. a corrugated portion, in which buffer area the bottom wall is free from, and spaced relative to, the seal. this buffer area allows the bottom wall, or at least the inner portion of the bottom wall, at which the outflow aperture is provided, to travel over a longer distance than the inner end of the seal, thus making sure that the bottom wall, or at least part thereof, is indeed pulled away from the seal, at least at the outflow aperture, by moving the column in the downward direction.

In a further embodiment, an insert is provided in the reservoir, which insert provides a sealing area for the seal at the outer circumferential wall, and which insert area spaces the seal at least partially at a distance from the bottom wall, to thus enable the bottom wall, at least at the outflow aperture, to be pulled away from the seal.

The capsule body is provided with a top seal, sealed to the top end of the outer wall and the inner wall, i.e. the top end of the column, of the capsule.

The top sealing film is configured to be pierced or ruptured, and thus enable a pressurised gas to enter the reservoir in order to promote dispensing of the liquid ingredient via the outflow aperture, or apertures, of the reservoir.

Preferably, the top sealing film is configured to be pierced or ruptured by the top end of the column being pushed downward relative to the outer wall of the capsule.

In an embodiment, the capsule is provided with piercing elements, located inside the reservoir, for piercing the top seal from the inside the reservoir. In addition, or as an alternative, the sealing film can be provided with scored lines to promote tearing of the sealing film in particular areas. In an embodiment, pushing down the top end of the column creates tension in the top sealing film, causing the top sealing film to rupture.

In yet another embodiment, the top seal is ruptured due to local application of pressure by a blunt part of the dome member of the dispenser in which the cartridge is received for dispensing the beverage. In such an embodiment, one or more top seal rupturing protrusions are provided at a bottom side of the dome member for engaging the top seal. Thus, when the dome member is lowered onto the cartridge, the one or more top seal rupturing protrusions engage the top seal and rupture it.

In an embodiment, the bottom side of the dome member is furthermore provided with one or more capsule stabilisation members, which are to be inserted into the access opening of the capsule body prior to the top seal being opened. The stabilisation members are located near or at the top of the circumferential wall to keep the circumferential wall from being pulled inward by the top seal being pulled inward when the top of the column is pushed downward.

In an embodiment, the stabilisation member is a ring that is concentric with the access opening, and which is able to support the circumferential wall along its entire circumference. In another embedment, for example two stabilisation fingers are provided, on opposite sides of the column of the cartridge to be opened, e.g. at the three o clock and nine o clock position, and two bodies for tensioning the top seal in order to tear it, are located on opposite sides of the column, e.g. at the twelve o clock and the sic o clock position. It is noted that when two tensioning bodies are used to stress the top seal up to rupture, these tend to pull two opposite sides of the circumferential wall inwards. To prevent this from happening, the stabilisation fingers are provided to support these two opposite sides, and thus keep the cartridge in shape.

It is observed that positioning the capsule stabilisation members into the capsule access opening prior to the top seal being opened, may also tension the top seal, be it to a lesser extent than required for the top seal to tear open.

In an embodiment, an insert is provided in the reservoir of the capsule body. The insert can be configured to serve as a base for fixing one end of a bottom seal also provided inside the reservoir. In such an embodiment, the insert is provided with one or more sealing areas, for fixing the seal to. In another embodiment, the insert can be provided with piercing elements for piercing the top seal from the inside of the reservoir, to provide apertures in the top seal enabling a pressurised gas to flow inside the reservoir to promote the outflow of liquid ingredient out of the reservoir. In yet another embodiment, the insert both provides a sealing surface for fixing an outer end of a bottom seal and is provided with piercing elements for piercing the top seal.

In an embodiment, the cartridge is provided with a piercing member for piercing the bottom of the capsule. The bottom piercer is provided inside the reservoir, and is moveable relative to at least the outside wall of the capsule.

Preferably, the bottom piercer engages the top end of the column, such that when the activation surface of the bottom piercer is pushed downward the top end of the column moves with it, and the column collapses. Preferably, the column guides the bottom piercer in the downward direction.

In an embodiment, the bottom piercer comprises two or more piercing members, preferably located at even intervals around the column, wherein each piercing member is located above a pierceable bottom area. For example above one large pierceable bottom area or individual pierceable bottom areas.

In an embodiment, the bottom piercer also comprises top seal piercing elements and/or top seal pulling elements.

The invention furthermore provides a cartridge for providing a liquid product, the cartridge comprising:

a sealed capsule filled with a portion of a liquid ingredient to be combined with a base liquid for the preparation of the liquid product, e.g. a beverage concentrate to be combined with water, e.g. carbonated water, for the preparation of a beverage, wherein the sealed capsule comprises:

- a, preferably thermoformed, capsule body with a bottom and a top, the capsule body comprising an outer circumferential wall, an inner circumferential wall and a bottom wall, the walls delimiting an annular reservoir between them, wherein the inner circumferential wall and the outer circumferential wall at a top end are respectively provided with an inner sealing surface and an outer sealing surface, the sealing surfaces delimiting a reservoir access opening between them, wherein the inner circumferential wall forms a compressible column, the column having an internal cavity that extends between an upper opening, preferably encircled by the inner sealing surface, at a top of the column and a bottom opening at a bottom end of the column, and wherein the bottom wall of the capsule body is provided with at least one reservoir outlet in the form of an aperture, and, on a bottom surface of the bottom wall, with a peripheral sealing surface and an aperture sealing surface encircling the reservoir outflow aperture, wherein the aperture sealing surface is located between the peripheral sealing surface and the bottom opening of the column;

- a top seal, e.g. a top sealing film, sealed to the inner sealing surface and the outer sealing surface and covering the reservoir, the top seal hermetically sealing the access opening of the reservoir; and
- a bottom seal, releasable sealed to the aperture sealing surface, hermetically sealing the reservoir outlet, and fixed to the peripheral sealing surface, and;

wherein the cartridge further comprises:

a nozzle, received in the cavity, for guiding a flow of base liquid through at least part of the cavity, and for dispensing the base liquid at a bottom side of the capsule, wherein the nozzle comprises:

- a nozzle body having a channel extending between an inlet opening at a top end of the nozzle and an outlet opening at a bottom end of the nozzle, wherein the nozzle is moveable, relative to the outer circumferential wall of the capsule body, from a raised passive position into a lowered dispensing position, wherein the nozzle furthermore has a flange at the bottom end, the flange having a sealing surface for the bottom seal and having at least one dispensing aperture, the dispensing aperture penetrating the flange near or at the outlet opening, for dispensing liquid ingredient at or adjacent the flow of base liquid exiting the outlet opening, wherein the bottom seal is fixed to the sealing surface of the nozzle, and, when the nozzle is moved into the dispensing position, preferably by compressing the column, the nozzle pulls the bottom seal away from the aperture in the bottom wall of the capsule, enabling liquid ingredient to flow out of the reservoir, and wherein the bottom seal, when the nozzle is in the dispensing position, remains attached to the peripheral sealing surface of the bottom of the capsule and the sealing surface of the nozzle, enabling the liquid ingredient to flow along the bottom seal from the aperture in the bottom of the capsule to the dispensing aperture of the nozzle.

In an embodiment, the top seal is a sealing film, covering the reservoir, which sealing film preferably is provided with one or more premade score lines, e.g. by laser machining or otherwise partly through the thickness of the film, which are embodied such that pressing the column inward, e.g. downward, to said dispensing position causes said one or more premade score lines to rupture thereby providing said one or more openings.

In an embodiment, the bottom seal is a sealing film, and the one or more reservoir outlets are initially sealed by the bottom sealing film of the cartridge, e.g. said bottom sealing film being the sole closure of the one or more outflow openings, wherein the motion of the column to said lower dispensing position thereof causes the bottom sealing film of the cartridge to form a guide surface for guiding liquid ingredient dispensed from the one or more reservoir outlets initially sealed by said bottom sealing film towards the nozzle, and thereby to enable the dispensing of the liquid ingredient from the cartridge via the nozzle.

In such an embodiment, the capsule is opened by pushing part of the nozzle out of the column of the capsule body, the nozzle thus pulling the centre of the bottom seal away from the bottom wall of the capsule body, and thus opening the outflow apertures of the reservoir.

In an embodiment, pushing down the top of the column, and thus moving the nozzle into a dispensing position, first tears the bottom seal from the aperture sealing surface, thus opening the outflow apertures, and only the opens the top seal, e.g. by providing enough tension in the top seal for it to tear open, e.g. at premade score lines and/or by a body, e.g. a blunt part of the dome, pushing down on the top seal. Thus, the liquid ingredient is free to run from the reservoir before the top seal is pushed fully down, which prevents a pressure build up in the reservoir due to the top seal being pushed downward by moving the top of the column downward. This in turn reduces the chance of an explosive discharge of the liquid ingredient from the reservoir, when the bottom seal is pulled from the outflow apertures to open the sealed capsule.

Preferably the bottom sealing film has a premade hole aligned with the outlet opening of the nozzle for dispensing the base liquid. The sealing film is sealed to the nozzle, preferably to a flange of the nozzle, along the periphery of the premade hole.

In an embodiment, the top seal and the bottom seal are a multi-layer sealing film, the seal comprising multiple layers of different materials.

In an embodiment, the capsule is provided with an oval or diamond shaped bottom seal, and the capsule body is provided with two outflow openings in its bottom wall, which outflow openings are provided on opposite sides of the column. Preferably, the oval or diamond shaped seal has a longitudinal axis and a shorter cross axis, and the outflow openings are located above the longitudinal axis. This configuration is optimal for, after the bottom seal is pulled away from the reservoir out, providing a guide or funnel, that receives the liquid ingredient dispensed from the reservoir, and that subsequently guides the liquid ingredient to liquid ingredient dispensing apertures provided in the nozzle for dispensing the liquid ingredient at the outlet opening of the nozzle, i.e. the opening at which the base liquid is dispensed, such that the liquid ingredient is dispensed, via the liquid ingredient dispensing apertures, parallel and adjacent to the flow of base liquid.

In an embodiment, the capsule body is provided with a shoulder, i.e. a recess, along the periphery of the bottom wall, i.e. at the transition from the circumferential wall and the bottom wall of the capsule body, to provide the capsule with extra rigidity in this area to support the bottom seal when it is stretched by the nozzle being lowered into the dispensing position, and prevent the capsule from being pulled out of model by the nozzle stretching the bottom seal. This is in particular beneficial when the bottom seal is oblong, i.e. oval or diamond shaped, and the load on the capsule body by the bottom seal being stretched is not evenly distributed along the bottom wall.

The bottom seal has a central opening, through which the bottom end of the nozzle may protrude. The seal is at its circumference sealed to the bottom of the capsule body, and along the central opening of the seal sealed to a flange of the nozzle. The seal is furthermore sealed to the bottom wall of the capsule body around the outflow apertures of the reservoir.

In such an embodiment, the capsule is opened by pushing part of the nozzle out of the column of the capsule body, the nozzle thus pulling the centre of the bottom seal away from the bottom wall of the capsule body, and thus opening the outflow apertures of the reservoir.

In an embodiment, the nozzle, preferably the flange of the nozzle, and the bottom sealing film together function as a guide member for guiding the liquid ingredient from the one or more reservoir outlets towards the nozzle, when the nozzle is in a lowered dispensing position.

In an embodiment, the capsule body is a made out of a multi-layer material, preferably is thermoformed out of a sheet of multi-layer material, such that the walls of the capsule comprises multiple layers of different materials, the materials having different barrier properties. In an embodiment, the multi-layer material comprises at least one layer of EVOH material and/or stretched PP-material.

In an embodiment, the top seal and/or the bottom seal are/is a sealing film, preferably a multi-layer sealing film, e.g. a comprising multiple layers of different materials, the multiple layers preferably comprising at least one layer of EVOH material and/or stretched PP-material.

In an embodiment, the nozzle comprises one or more injection moulded components.

In an embodiment, the column of the cartridge body is a compressible column, and the top of the column can be moved relative to, and towards, the bottom of the column.

In an further embodiment, the column is provided with a buckling portion, i.e. a local area of the column that is configured to buckle when a pressure is exerted on the top of the column.

The buckling portion thus enables movement of the top of the column towards the bottom of the column.

In a further embodiment, the buckling portion comprises a annular band of parallelogram shaped recesses, which recess are separated by linear ridges. The parallelogram shaped recesses, e.g. diamond shaped recesses, are each positioned with two opposite sides substantially perpendicular to a longitudinal axis of the column, when seen in side view, and with the other two opposite sides at an angle to the longitudinal axis of the column, when seen in side view.

In an embodiment, a lower portion of the column is provided with a reinforcing structure, which reinforcement structure comprises linear ribs that extend in a direction parallel to a longitudinal axis of the column, when seen in side view.

The invention furthermore provides a cartridge for providing a liquid product, the cartridge comprising:

a sealed capsule filled with a portion of a liquid ingredient to be combined with a base liquid for the preparation of the liquid product, e.g. a beverage concentrate to be combined with water, e.g. carbonated water, for the preparation of a beverage, wherein the sealed capsule comprises:

a, preferably thermoformed, capsule body with a bottom and a top, the capsule body comprising an outer circumferential wall, an inner circumferential wall and a bottom wall, the walls delimiting an annular reservoir between them, wherein the inner circumferential wall and the outer circumferential wall at a top end are respectively provided with an inner sealing surface and an outer sealing surface, the sealing surfaces delimiting a reservoir access opening between them, wherein the inner circumferential wall forms a column, the column having an internal cavity that extends between an upper opening, preferably encircled by the inner sealing surface, at a top of the column and a bottom opening at a bottom end of the column, and wherein the column is a collapsible column, i.e. the inner circumferential wall is configured to buckle when the top end of the column is pressed downwards towards the bottom end of the column, wherein the bottom wall of the capsule body is provided with at least one reservoir outlet in the form of a pierceable bottom area; and a top seal, e.g. a top sealing film, sealed to the inner sealing surface and the outer sealing surface and covering the reservoir, the top seal hermetically sealing the access opening of the reservoir, wherein the cartridge further comprises:

a nozzle, received in the cavity, for guiding a flow of liquid through at least part of the cavity, and for dispensing the base liquid at a bottom side of the capsule, wherein the nozzle comprises:

a nozzle body having a channel extending between an inlet opening at a top end of the nozzle and an outlet opening at a bottom end of the nozzle, wherein the nozzle is moveable, relative to the outer circumferential wall of the capsule body, from a raised passive position into a lowered dispensing position, preferably a guide member, attached to the bottom of the capsule and extending from below the pierceable bottom area, for receiving liquid ingredient flowing from the reservoir outlet, towards and below the bottom opening of the column, to dispense the liquid ingredient at or adjacent the flow of base liquid exiting the outlet opening of the nozzle, when in the nozzle is in the lowered dispensing position;

a bottom piercer, wherein the bottom piercer has a top end and a bottom end, and is provided with an activation surface at a top end thereof, which activation surface is located at, or is adjacent to, the top end of the column, and a piercing member at a bottom end thereof, which piercing member is located at, or adjacent to, the bottom end of the column, and above the pierceable bottom area, and wherein pushing the bottom piercer in a downward direction makes the piercing member pierce the pierceable area of the bottom of the capsule, thus enabling liquid ingredient to flow out of the reservoir outlet.

In an embodiment, the bottom piercer is provided with two top seal opener members that are connected to the bottom piercer, e.g. so as to move down along with the bottom piercer. The top opener members each engage, e.g. are adhered to, the top seal at one or more areas that each are located in between the inner circumferential wall and the outer circumferential wall. Upon moving the bottom piercer down from its initial position to a lowered position, in which the reservoir outlet is pierced, the top seal opener members cause the top sealing film to be locally overstressed and thereby rupture and provide said one or more gas pressure introduction openings.

The invention furthermore provides a cartridge for providing a liquid product, the cartridge comprising:

a sealed capsule filled with a portion of a liquid ingredient to be combined with a base liquid for the preparation of the liquid product, e.g. a beverage concentrate to be combined with water, e.g. carbonated water, for the preparation of a beverage, wherein the sealed capsule comprises:

a, preferably thermoformed, capsule body with a bottom and a top, the capsule body comprising an outer circumferential wall, an inner circumferential wall and a bottom wall, the walls delimiting an annular reservoir between them, wherein the inner circumferential wall and the outer circumferential wall at a top end are respectively provided with an inner sealing surface and an outer sealing surface, the sealing surfaces delimiting a reservoir access opening between them, wherein the inner circumferential wall forms a column, the column having an internal cavity that extends between an upper opening, preferably encircled by the inner sealing surface, at a top of the column and a bottom opening at a bottom end of the column, and wherein the bottom wall has an annular flexible bottom portion around the column such that the column is movable downwards from an initial position to a lower operative position, wherein the bottom wall of the capsule body is provided with at least one reservoir outlet in the form of an aperture, and, on a top surface of the bottom wall, an aperture sealing surface encircling the aperture; and wherein, either the bottom wall, on a top surface, is provided with a peripheral sealing surface, the sealing surface extending along the circumference of the bottom wall, or the capsule comprises an insert located on or at the bottom wall of the capsule, wherein the insert is provided with a peripheral sealing surface, the peripheral sealing surface extending along the circumference of the bottom wall; and a top seal, e.g. a top sealing film, sealed to the inner sealing surface and the outer sealing surface and covering the reservoir, the top seal hermetically sealing the access opening of the reservoir, a bottom seal, releasable sealed to the aperture sealing surface, hermetically sealing the reservoir outlet, and fixed to the peripheral sealing surface, and;

wherein the cartridge further comprises:

a nozzle for guiding a flow of liquid through at least part of the cavity, and for dispensing the base liquid at a bottom side of the capsule, wherein the nozzle comprises a nozzle body having a channel extending between an inlet opening at a top end of the nozzle and an outlet opening at a bottom end of the nozzle, wherein the nozzle is moveable, with the column, relative to the outer circumferential wall of the capsule body, from a raised passive position into a lowered dispensing position, preferably a guide member, attached to the bottom of the capsule and extending from below the reservoir outlet, for receiving liquid ingredient flowing from the reservoir outlet, towards and below the bottom opening of the column, to dispense the liquid ingredient at or adjacent the flow of base liquid exiting the outlet opening of the nozzle, when the nozzle is in the lowered dispensing position;

wherein pushing the column in a downward direction from the initial position to the lower operative position pulls the aperture sealing surface away from the bottom seal, enabling liquid ingredient to flow out of the reservoir outlet.

The invention furthermore provides a cartridge for providing a liquid product, the cartridge comprising:

a sealed capsule filled with a portion of a liquid ingredient to be combined with a base liquid for the preparation of the liquid product, e.g. a beverage concentrate to be combined with water, e.g. carbonated water, for the preparation of a beverage, wherein the sealed capsule comprises:

a, preferably thermoformed, capsule body with a bottom and a top, the capsule body comprising an outer circumferential wall, an inner circumferential wall and a bottom wall, the walls delimiting an annular reservoir between them, wherein the capsule body preferably comprises multiple layers of different materials, the materials having different barrier properties;

wherein the inner circumferential wall and the outer circumferential wall at a top end are respectively provided with an inner sealing surface and an outer sealing surface, the sealing surfaces delimiting a reservoir access opening between them, wherein the inner circumferential wall forms a column, the column having an internal cavity that extends between an upper opening, preferably encircled by the inner sealing surface, at a top of the column and a bottom opening at a bottom end of the column, and wherein the bottom wall has an annular flexible bottom portion around the column such that the column is movable downwards from an initial position to a lower operative position, wherein the bottom wall of the capsule body is provided with at least one reservoir outlet in the form of an aperture, and, on a bottom surface of the bottom wall, an aperture sealing surface encircling the aperture; and a top seal, e.g. a top sealing film, sealed to the inner sealing surface and the outer sealing surface and covering the reservoir, the top seal hermetically sealing the access opening of the capsule, wherein the cartridge further comprises:

a nozzle for guiding a flow of base liquid through at least part of the cavity, and for dispensing the base liquid at a bottom side of the capsule, wherein the nozzle comprises:

a nozzle body having a channel extending between an inlet opening at a top end of the nozzle and an outlet opening at a bottom end of the nozzle, and on a bottom surface, a sealing surface, which sealing surface is located in the cavity such that a gap is present between the inner circumferential wall of the capsule body and the sealing surface provided on the nozzle, which gap is located between the reservoir outlet and the sealing surface on the nozzle, wherein the nozzle is moveable, with the column, relative to the outer circumferential wall of the capsule body, from a raised passive position into a lowered dispensing position, a bottom seal, releasable sealed to the aperture sealing surface, hermetically sealing the reservoir outlet, and fixed to the sealing surface on the nozzle, such that the bottom seal extends over the gab, and;

a guide member, attached to the bottom of the capsule at or near the outer circumferential wall, such that the guide member is in a fixed position relative to the outer circumferential wall, and extending from below the reservoir outlet, for receiving liquid ingredient flowing from the reservoir outlet, towards and below the bottom opening of the column, to dispense the liquid ingredient at or adjacent the flow of base liquid exiting the outlet opening of the nozzle, when the nozzle is in the lowered dispensing position, wherein the guide member is provided with a rib element which extends in an upward direction towards the bottom seal when the column is in the initial position, and which rib element engages the bottom seal and is received in the gab, when the column is in the lower operative position, such that by moving the column, relative to the outer circumferential wall of the capsule body, from the raised passive position into the lowered dispensing position, the rib element pulls the bottom seal away from the reservoir outlet to enable liquid ingredient to flow out of the reservoir outlet.

Thus, the invention provides a cartridge for providing a liquid product, the cartridge comprising:

a sealed capsule filled with a portion of a liquid ingredient to be combined with a base liquid for the preparation of the liquid product, e.g. a beverage concentrate to be combined with water, e.g. carbonated water, for the preparation of a beverage, wherein the sealed capsule comprises:

a capsule body with a bottom and a top, the body delimiting a reservoir that is filled with the portion of a liquid ingredient, wherein the top has an access opening in communication with said reservoir, wherein the capsule body further comprises a column that projects upwards from the bottom to a top end of the column, the column providing the reservoir with an annular shape, wherein a cavity extends through the column from a top opening at the top end of the column to a bottom opening at a bottom end of the column, which bottom opening is located at the bottom of the capsule body, wherein the column has a wall having an inside surface that delimits the cavity, and a top surface at the top end of the column, wherein the bottom wall of the capsule body is provided with at least one reservoir outlet in the form of an aperture sealed with a bottom seal, or in the form of a pierceable bottom area, and wherein at least the top end of the column is movable downwards from an initial position to a lower operative position, either because the column is a collapsible column, i.e. the inner circumferential wall is configured to buckle when the top end of the column is pressed downwards towards the bottom end of the column, or because the column is a moveable column, i.e. the bottom wall has an annular flexible bottom portion around the column such that the column is movable downwards from an initial position to a lower operative position; and a top seal, e.g. a top sealing film, sealed to the inner sealing surface and the outer sealing surfaces and covering the reservoir, the top seal thus hermetically sealing the access opening of the capsule, a nozzle for guiding a flow of base liquid through at least part of the cavity of the column, and for dispensing the base liquid at a bottom side of the capsule, wherein the nozzle comprises a nozzle body having a channel extending between an inlet opening at a top end of the nozzle and an outlet opening at a bottom end of the nozzle, wherein the nozzle is received in the cavity of the column with its inlet opening directed towards the upper opening of the cavity and its outlet opening directed towards the lower opening of the cavity, and wherein the nozzle is moveable, preferably with the top end of the column, relative to the outer circumferential wall of the capsule body, from a raised passive position into a lowered dispensing position, wherein moving the top end of the column relative to the circumferential wall, initiates removing the bottom seal form the outflow aperture or piercing the pierceable area of the outflow aperture, to open the capsule, enabling the liquid ingredient to flow out of the reservoir.

The invention furthermore provides a cartridge with a fixed column and a moveable nozzle received in said column. In such an embodiment, the cartridge is configured to receive a feed lance from a dispensing device, which fee lance engages the nozzle, and moves the nozzle from an initial raised position, into an active lowered position.

In such an embodiment, the cartridge for providing a liquid product, the cartridge comprises:

a sealed capsule filled with a portion of a liquid ingredient to be combined with a base liquid for the preparation of the liquid product, e.g. a beverage concentrate to be combined with water, e.g. carbonated water, for the preparation of a beverage, wherein the sealed capsule comprises:

a, preferably thermoformed, capsule body with a bottom and a top, the capsule body comprising an outer circumferential wall, an inner circumferential wall and a bottom wall, the walls delimiting an annular reservoir between them, wherein the inner circumferential wall and the outer circumferential wall at a top end are respectively provided with an inner sealing surface and an outer sealing surface, the sealing surfaces delimiting a reservoir access opening between them, wherein the inner circumferential wall forms a column, the column having an internal cavity that extends between an upper opening, preferably encircled by the inner sealing surface, at a top of the column and a bottom opening at a bottom end of the column, and wherein the bottom wall of the capsule body is provided with at least one reservoir outlet in the form of an aperture, and, on a bottom surface of the bottom wall, with a peripheral sealing surface and an aperture sealing surface encircling the reservoir outflow aperture, wherein the aperture sealing surface is located between the peripheral sealing surface and the bottom opening of the column;

a top seal, e.g. a top sealing film, sealed to the inner sealing surface and the outer sealing surface and covering the reservoir, the top seal hermetically sealing the access opening of the capsule; and a bottom seal, releasable sealed to the aperture sealing surface, hermetically sealing the reservoir outlet, and fixed to the peripheral sealing surface, and;

wherein the cartridge further comprises:

a nozzle, received in the cavity, for guiding a flow of base liquid through at least part of the cavity, and for dispensing the base liquid at a bottom side of the capsule, wherein the nozzle comprises:

a nozzle body having a channel extending between an inlet opening at a top end of the nozzle and an outlet opening at a bottom end of the nozzle, wherein the nozzle is moveable, relative to the column, from a raised passive position into a lowered dispensing position, wherein the nozzle furthermore has a flange at the bottom end, the flange having a sealing surface for the bottom seal and having at least one dispensing aperture, the dispensing aperture penetrating the flange near or at the outlet opening, for dispensing liquid ingredient at or adjacent the flow of base liquid exiting the outlet opening, wherein the bottom seal is fixed to the sealing surface of the nozzle, and, when the nozzle is moved into the dispensing position, preferably by compressing the column, the nozzle pulls the bottom seal away from the aperture in the bottom wall of the capsule, enabling liquid ingredient to flow out of the reservoir, and wherein the bottom seal, when the nozzle is in the dispensing position, remains attached to the peripheral sealing surface of the bottom of the capsule and the sealing surface of the nozzle, enabling the liquid ingredient to flow along the bottom seal from the outflow aperture in the bottom of the capsule to the dispensing aperture of the nozzle.

Preferably, the cartridge according to the claimed invention is configured to dispense base liquid, via the nozzle, and the liquid ingredient, at a bottom of the cartridge. Preferably, the base liquid and the liquid ingredient are not mixed in the cartridge, and are dispensed as distinct flows. Furthermore, preferably the distinct flows are dispensed such that they adhere to each other, preferably, below the cartridge one or more flows of liquid ingredient are adhered to a single flow of base liquid.

For example, in an embodiment the cartridge comprises a guide member and a nozzle, and the guide member and the nozzle form a dispense aperture between them for dispensing the liquid ingredient closely adjacent the base liquid dispensed from the nozzle, preferably dispense the ingredient in the form of a shroud, said shroud coating the flow of base liquid.

The invention furthermore provides a system for the preparation of a liquid product, e.g. a liquid food product, e.g. a beverage, which system comprises:

a) a cartridge according to the invention;

b) a dispensing apparatus, e.g. a beverage dispensing apparatus, the apparatus comprising:

a holder adapted to accommodate and retain the cartridge at a dispensing location in the apparatus, a base liquid feed assembly with a base liquid feed member, e.g. a lance, disposed at the dispensing location, which base liquid feed member is embodied to connect to the channel in the column of the cartridge, so that base liquid can be fed into the channel, an operable displacement device which is adapted to produce a movement of the holder for the cartridge and the base liquid feed member relative to each other in order to connect the base liquid feed member to the channel and to move column, or at least the top of the column, down from the raised passive position to said lowered dispensing position, a pressurized gas source, preferably a pressurized air source, e.g. an air pump, wherein the apparatus is adapted to bring said pressurized gas source in direct communication with the reservoir of the capsule so as to allow said liquid ingredient therein to be pressurized by said gas thereby assisting the dispensing thereof from the reservoir via said one or more dispensing passages, wherein the system is adapted to create one or more gas pressure introduction openings in the top sealing film that covers the reservoir access opening, the dispensing apparatus further comprising a pressurization dome member having a peripheral gas seal, e.g. along a periphery thereof an outer gas seal, which is adapted to sealingly engage the cartridge around a location where said one or more openings are created in said top sealing film to allow entry of said pressurized gas into the reservoir, the pressurized gas source being connected to said dome member and adapted to feed pressurized gas beneath said dome member within the contour of the peripheral gas seal sealingly engaging the cartridge, so as to allow said liquid ingredient in said reservoir to be pressurized by said gas via the one or more gas pressure introduction openings in said sealing film, thereby assisting the dispensing of the liquid ingredient from the reservoir via said at least one reservoir outlet, wherein the cartridge is configured such that, moving at least the top of the column downward, causes the top sealing film to be locally pierced and/or overstressed and thereby to be ruptured and provide said one or more gas pressure introduction openings.

In an embodiment of a system, the top sealing film is preweakened to promote rupture of the film, preferably is pre-weakened at or near the one or more locations.

In an embodiment of a system, the outer circumferential wall of the capsule body is provided with a flange, e.g. an outwardly protruding flange, said flange forming a peripheral top portion of the cartridge body, said top seal being adhered to said flange at said outer seal area.

In an embodiment of a system, the base liquid feed member is a base liquid feed lance which protrudes from the pressurization dome member, preferably within the contour of the of the peripheral gas seal.

In an embodiment of a system, the one or more reservoir outlets of the cartridge are arranged at said bottom side of the cartridge and spaced from the column so that liquid ingredient emerges from said one or more reservoir outlets as a flow or flows distinct from the stream of base liquid emerging from the nozzle, and wherein the one or more reservoir outlets are arranged so, or a guide member is provided so, that liquid ingredient emerging from the reservoir outlets adjoins the outside of the base liquid stream that has emerged from the nozzle.

In an embodiment of a system, the one or more reservoir outlets of the cartridge are arranged at a height that corresponds to the height of the outlet opening of the nozzle or a height above the outlet opening of the nozzle, when the nozzle is in the lowered position.

In an embodiment of a system, the one or more reservoir outlets are initially sealed by a bottom seal of the cartridge, e.g. said bottom sealing film being the sole closure of the one or more reservoir outlets, and wherein the downward motion of the column, or at least the top end of the column, causes the bottom seal of the cartridge to rupture and/or tear away from one or more reservoir outlets initially sealed by said bottom seal, and thereby to allow the dispensing from the cartridge.

In an embodiment of a system, the one or more reservoir outlets are arranged, or a guide member is provided, so that the liquid ingredient emerging from the reservoir outlets adjoins the outside of the base liquid stream that has emerged from the nozzle as an annular shroud around said base liquid stream.

In an embodiment of a system, the dispensing apparatus is adapted to pressurize the liquid ingredient in the reservoir so that the one or more streams of liquid ingredient emerging from the one or more reservoir outlets flow as a slow flow along with the base liquid stream emerging from the nozzle, which slow flow adjoins the outside of the base liquid stream.

In an embodiment of a system, a guide member is provided below the capsule body and below the reservoir outlet, which guide member comprises a guide surface oriented at an angle relative to the flow of liquid ingredient emerging from the reservoir such that a jet of liquid ingredient emerging from the reservoir outlet due to the gas pressurization of the liquid ingredient collides against the guide surface of the guide member thereby reducing, preferably annihilating, the speed of said jet.

In an embodiment of a system, the holder is a drawer comprising a cavity for receiving the cartridge therein, e.g. said cartridge being suspended in said cavity by an outward flange of an outer circumferential wall of the capsule body, which drawer is movable into a housing of the apparatus so that the cartridge is movable into the dispensing location, and wherein the operable displacement device is adapted to move the pressurization dome member up and down relative to housing so as to sealingly engage—in a lower position of the dome member—the peripheral gas seal with the cartridge around a location where the sealing film is opened to allow entry of pressurized gas into the reservoir.

In an embodiment, the holder is a configured to support the cartridge below the flange of the cartridge only. In such an embodiment, the holder is for example ring shaped or is a drawer wherein the cavity for receiving the cartridge therein is completely free of a bottom or similar that supports the bottom of the cartridge. Thus, in such an embodiment the cartridge has a bottom that is free hanging when the cartridge is in the holder.

In an embodiment of a cartridge according to the invention, the top sealing film is provided with a temperature responsive colouring area, which colouring area changes colour due to temperature change and thereby provides an indication of the actual temperature of the liquid ingredient. The dispensing apparatus may then have a sensor reading the temperature or an indicator thereof on the cartridge, or the user may be guided to provide the correct input for the apparatus.

In an embodiment, the column of the cartridge body is a compressible column, and the top of the column can be moved relative to, and towards, the bottom of the column.

In an further embodiment, the column is provided with a buckling portion, i.e. a local area of the column that is configured to buckle when a pressure is exerted on the top of the column.

The buckling portion thus enables movement of the top of the column towards the bottom of the column.

In an embodiment, the column is provided with an annular buckling portion, the buckling portion comprising a faceted area that promotes local collapse of the column.

In a further embodiment, the buckling portion comprises a annular band of parallelogram shaped recesses, which recess are separated by linear ridges. The parallelogram shaped recesses, e.g. diamond shaped recesses, are each positioned with two opposite sides substantially perpendicular to a longitudinal axis of the column, when seen in side view, and with the other two opposite sides at an angle to the longitudinal axis of the column, when seen in side view.

The parallelogram shaped recesses locally reduce the capability of the wall of the column to support a load applied to the top of the column. In contrast, the ridges separating the parallelogram shaped recesses form narrow rigid areas that connect the part of the column below the band of the parallelogram shaped recesses with the part of the column above the band of parallelogram shaped recesses.

When the top of the column is pushed downward, the wall of the column buckles at the parallelogram shaped recesses while the ridges between the recessed areas more or less stay intact. The ridges are pushed from an angled position towards a horizontal position, causing the recessed areas between the ridges to fold onto themselves. Thus, the column buckles and the top of the column moves downward towards the lowered end of the column.

In a further embodiment, the column is provided with two bands of parallelogram shaped recesses, wherein the ridges between the recesses of the upper band extend at an angle opposite to the angle of the ridges of the lower band.

It is submitted that the buckling of the column using parallelogram shaped recesses causes the part of the column above the band of parallelogram shaped recesses to rotate about a vertical axis relative to the part of the column below the band of parallelogram shaped recesses. By providing the ridges of the lower band and the upper band of parallelogram shaped recesses at opposite angles, the rotational movement caused by the upper row of parallelogram shaped recesses is counteracted by the rotational movement of the lower row of parallelogram shaped recesses. Thus, in such an embodiment, the buckling causes no, or only minimal, rotation of the upper end of the column relative to the lower end of the column.

In an embodiment, a lower portion of the column is provided with a reinforcing structure. This reinforcing structure is provided to resists buckling of the column when the top of the column is pressed downward, and thus further promotes confinement of the buckling to a specific area of the column, i.e. to confine buckling of the column to the buckling portion of the column.

In an embodiment, the reinforcement structure comprises linear ribs that extend in a direction parallel to a longitudinal axis of the column, when seen in side view. The ribs extending parallel to the direction of a force applied to the top of the column to move it in the downward direction, makes that the ribs resist buckling of the column.

It is submitted that in the above, the recesses can also be provided in the form of protrusions. In both cases, the recessed or protruding area is located outside the plane of the wall.

The invention furthermore provides a method for the preparation of a liquid product, e.g. a liquid food product, e.g. a beverage, wherein use is made of a cartridge according to the invention, preferably use is made of a system according comprising a cartridge according to the claimed invention, wherein the method comprises:

- sealingly engaging the peripheral gas seal of the pressurization dome member with the cartridge around a location where the top sealing film is or will be opened to allow entry of pressurized gas into the reservoir, e.g. onto an upper end of a circumferential wall of the cartridge,
- causing the top sealing film to open at said one or more locations,
- causing the at least one reservoir outlet to open, preferably by pushing down at least the top end of the column of the cartridge,
- feeding pressurized gas beneath said dome member thereby pressurizing the liquid ingredient in the reservoir of the capsule by said gas thereby assisting the dispensing thereof from the reservoir via said one or more dispensing passages.

In a further embodiment, the method comprises opening the sealed capsule of the cartridge by pushing down the top end of the column, thus collapsing part of the column and moving the nozzle downward into a dispensing position, whereby the nozzle pulls the bottom seal away from the at least one reservoir outlet, causing the outlet to open.

The invention furthermore provides a method for manufacturing a cartridge according to the invention, the method comprising:

- forming the capsule body out of a multilayer sheet, using the thermoform technique.

In a further embodiment, the method comprises:

- mounting the nozzle in the cavity of the column of the capsule body; and
- fixing the bottom seal to the bottom of the cartridge and to the nozzle, and sealing the at least one reservoir outlet with the bottom seal.

In a further embodiment, the method comprises:

- filling the reservoir of the capsule body with a liquid ingredient; and
- sealing the reservoir of the capsule by sealing the top seal to the top of the circumferential wall and to the top of the column.

The cartridge according to the claimed invention preferably is a single use, or disposable cartridge, i.e. the contents of the cartridge are used for providing a single beverage. In an embodiment, the cartridge is configured, i.e. comprises a volume of liquid ingredient, to dispense multiple beverages simultaneously. In such an embodiment the dispensing device in which the cartridge is received, or the cartridge, provided with a device to split the combined flow of base liquid and liquid ingredient, for example into two separate flows to fill two containers with a single serve beverage.

The design of the cartridge allows for manufacturing the capsule body by way of thermoforming. Manufacturing the cartridge, more in particular the capsule body of the cartridge, by way of thermoforming allows for making the capsule body out of a sheet of multi-layer material. These multi-layered sheets typically comprise a base layer, to provide the capsule body with structural integrity, and one or more barrier layers, to provide the capsule body with the appropriate barrier properties. Preferably, the barrier layers are relatively thin compared to the base layer. Thus, the percentage of multi-layer material in the overall materials is small, which is beneficial for recycling the cartridge.

Also, the nozzle and, if present, the guide channel, preferably are injection moulded components, and preferably are made from the same material as the base material used in the capsule body. Thus, the cartridge consist mainly of the same material, which is beneficial for recycling the cartridge.

In an embodiment, the channel in the nozzle is divided in sub channels. In such an embodiment, the channel is provided with one or more fins, which fins extend in the axial direction of the channel. For example, a single fin may cross the channel to divide the channel into two sub channels. Furthermore, the fin preferably extends over a significant part of the length of the channel, preferably along the entire channel. Thus, a flow of base liquid that flows through the channel is divided into two sub-flows. It has been found that the fins further reduce the turbulence in the flow of base liquid being dispensed, in particular when the fins extend along substantially the entire length of the channel.

The invention furthermore provides a thermoformed capsule for providing a sealed capsule according to the invention, and multiple nested thermoformed capsules for providing sealed capsules according to the invention.

The invention furthermore provides a cartridge for providing a liquid product, the cartridge comprising:

a sealed capsule filled with a portion of a liquid ingredient to be combined with a base liquid for the preparation of the liquid product, e.g. a beverage concentrate to be combined with water, e.g. carbonated water, for the preparation of a beverage, wherein the sealed capsule comprises:

a, preferably thermoformed, capsule body with a bottom and a top, the capsule body comprising an outer circumferential wall, an inner circumferential wall and a bottom wall, the walls delimiting an annular reservoir between them, wherein the capsule body preferably comprises multiple layers of different materials, the materials having different barrier properties;

wherein the inner circumferential wall and the outer circumferential wall at a top end are respectively provided with an inner sealing surface and an outer sealing surface, the sealing surfaces delimiting a reservoir access opening between them, wherein the inner circumferential wall forms a column, the column having an internal cavity that extends between an upper opening, preferably encircled by the inner sealing surface, at a top of the column and a bottom opening at a bottom end of the column, and wherein the column is a compressible column, having a buckling portion, i.e. a local area of the column that is configured to buckle when a pressure is exerted on the top of the column;

wherein the bottom wall of the capsule body is provided with at least one reservoir outlet in the form of an aperture, and, on a bottom surface of the bottom wall, with a peripheral sealing surface and an aperture sealing surface encircling the reservoir outflow aperture, a top seal, e.g. a top sealing film, sealed to the inner sealing surface and the outer sealing surface and covering the reservoir, the top seal hermetically sealing the access opening of the reservoir, a bottom seal, releasable sealed to the aperture sealing surface, hermetically sealing the reservoir outlet, and fixed to the peripheral sealing surface; and wherein the cartridge further comprises:

a nozzle for guiding a flow of base liquid through at least part of the cavity, and for dispensing the base liquid at a bottom side of the capsule, wherein the nozzle comprises:

a nozzle body having a channel extending between an inlet opening at a top end of the nozzle and an outlet opening at a bottom end of the nozzle, wherein the nozzle furthermore has a sealing surface for a bottom seal and has at least one dispensing aperture for receiving a flow liquid ingredient guided by the bottom seal to the nozzle, and for dispensing the flow liquid ingredient in or adjacent the flow of base liquid guided through the channel of the nozzle, wherein the nozzle is moveable, relative to the outer circumferential wall of the capsule body, from a raised passive position into a lowered dispensing position.

wherein the bottom seal is fixed to the sealing surface of the nozzle, and, when the nozzle is moved into the dispensing position, preferably by compressing the column, the nozzle pulls the bottom seal away from the aperture sealing surface encircling the reservoir outflow aperture, enabling liquid ingredient to flow out of the reservoir, and wherein the bottom seal, when the nozzle is in the dispensing position, remains attached to the peripheral sealing surface of the bottom of the capsule and the sealing surface of the nozzle, enabling the liquid ingredient to flow along the bottom seal from the outflow aperture in the bottom of the capsule to the dispensing aperture of the nozzle.

A capsule according to the invention may also be configured to combine the flow or flows of liquid ingredient, dispensed form the reservoir, and the flow of base liquid dispensed through the nozzle.

The invention furthermore provides a method for providing a cartridge holding a liquid ingredient to be dispensed with a base liquid, the method comprising filling a cartridge according to the invention, the cartridge comprising the capsule, the nozzle and the bottom seal, and subsequently sealing the capsule using the top seal.

In an embodiment, the sealed capsule has a height between 36 mm and 40 mmm, for example has a diameter of 38 mm, and has a diameter at the top of the outer wall between 48 mm and 50 mm, for example has a diameter of 50 mm.

In an embodiment, the sealed capsule has an outer wall that stands out, such that the outer wall has a circumference at the bottom of the sealed capsule that is smaller than the circumference of the outer wall at the top end thereof. In an embodiment, the sealed capsule has a diameter at the top of the outer wall between 48 mm and 50 mm, for example has a diameter of 50 mm, and has a diameter at the bottom of the outer wall between the 47 mm and 40 mm, for example has a diameter of 43 mm or 46 mm In an embodiment, the column is a compressible column, and the column is configured to be compressed in the range of 5 mm to 10 mm, for example is configured to be compressed 7 mm. In such an embodiment, the column, when moved into the dispensing position, is moved 7 mm.

Advantageous embodiments of the cartridge according to the invention are disclosed in the sub claims and in the description, in which the invention is further illustrated and elucidated on the basis of a number of exemplary embodiments, of which some are shown in the schematic drawing. In the figures, components corresponding in terms or construction and/or function are provided with the same last two digits of the reference numbers.

In the figures.

Figure 1:
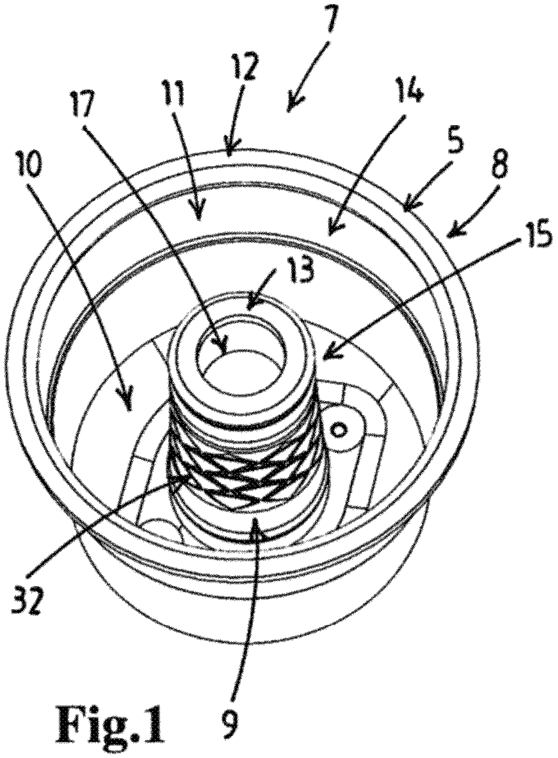
FIG. 1 shows a perspective top view of a capsule body of a first exemplary embodiment of a cartridge according to the invention.
Figure 2:
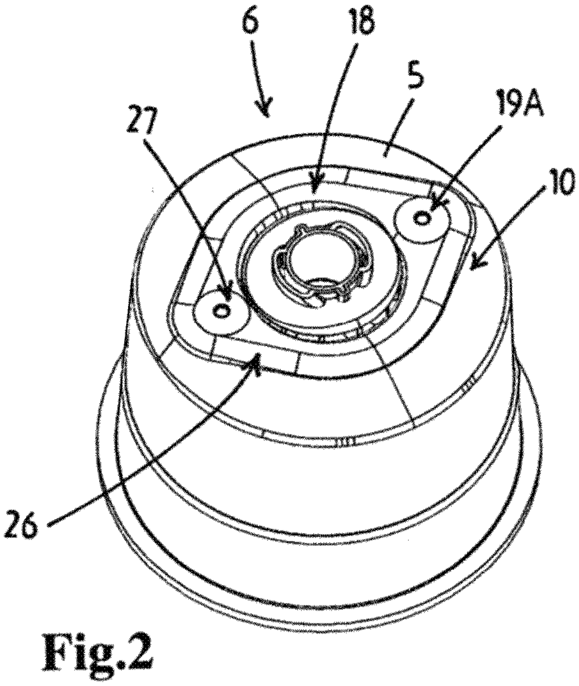
FIG. 2 shows a perspective bottom view of the capsule body of FIG. 1.
Figure 25:
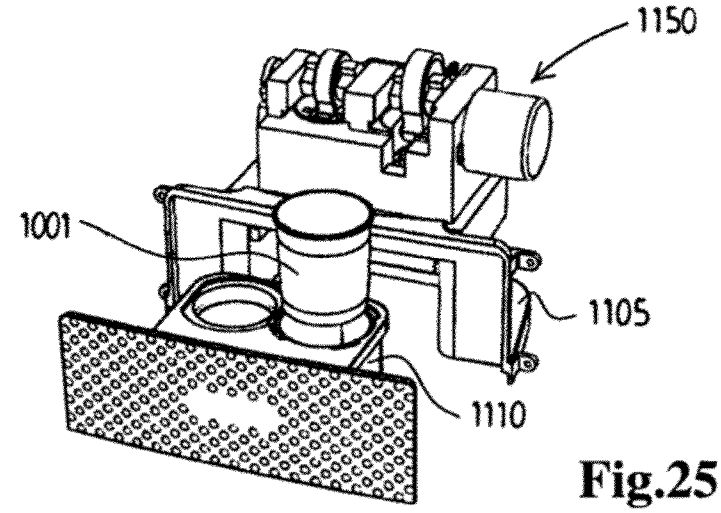
Figure 26:
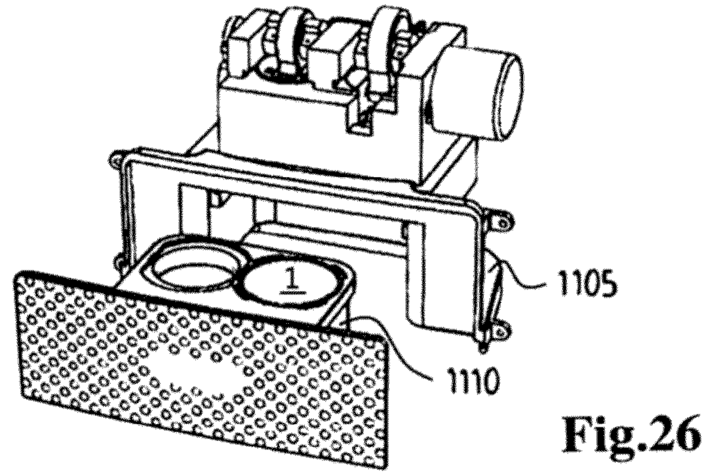
Figure 27:
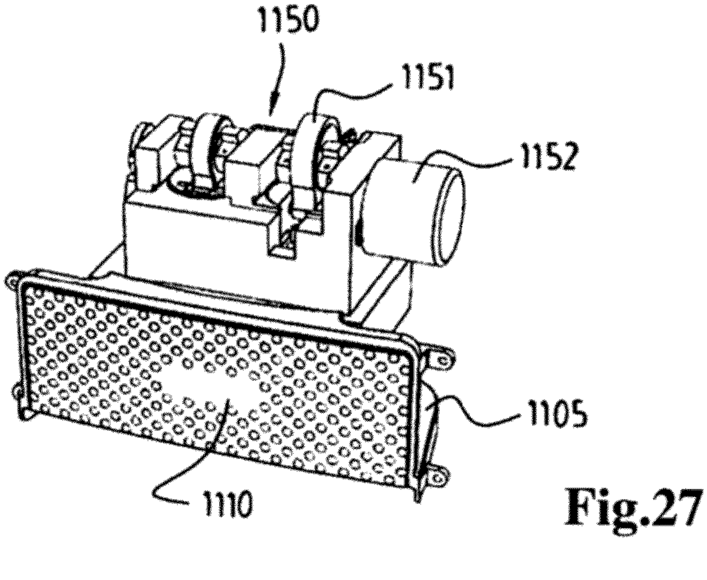
Figure 28:
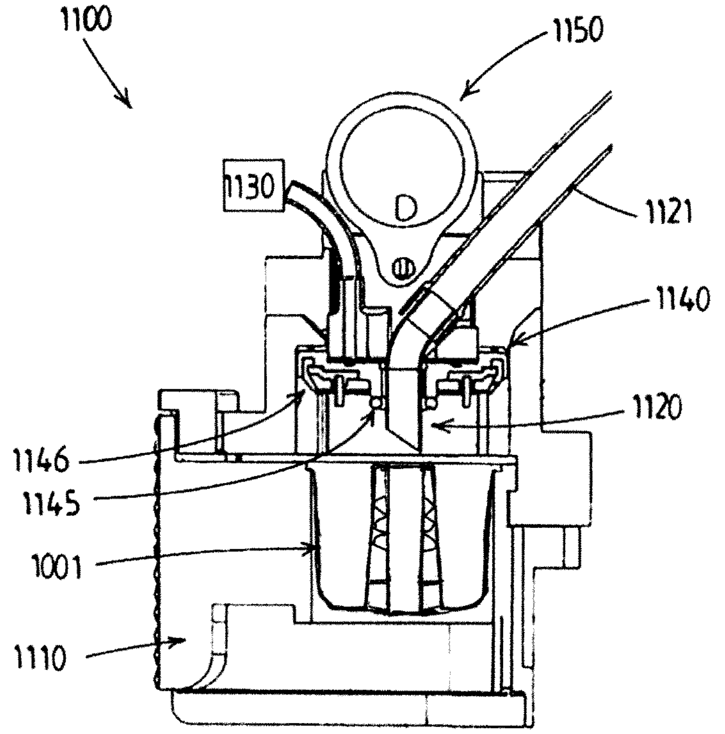
Figure 29:
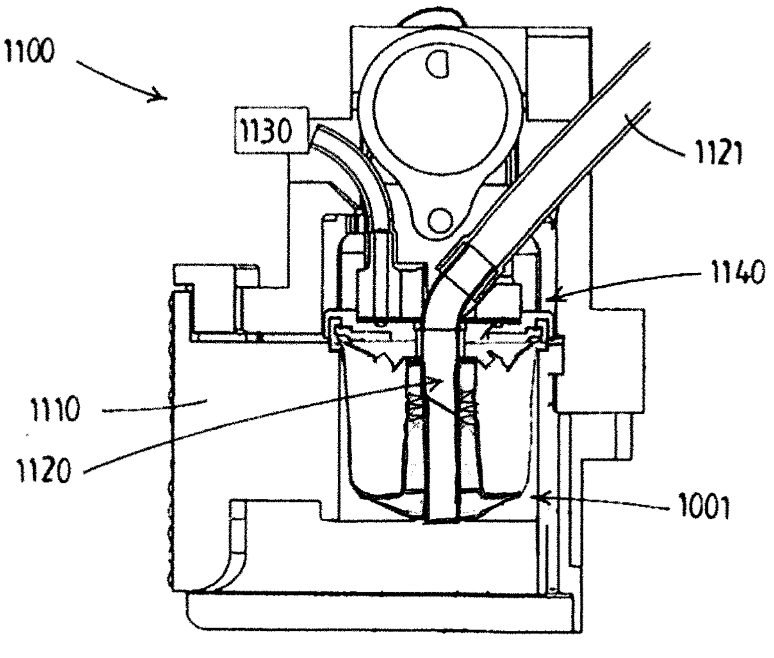
Figure 30:
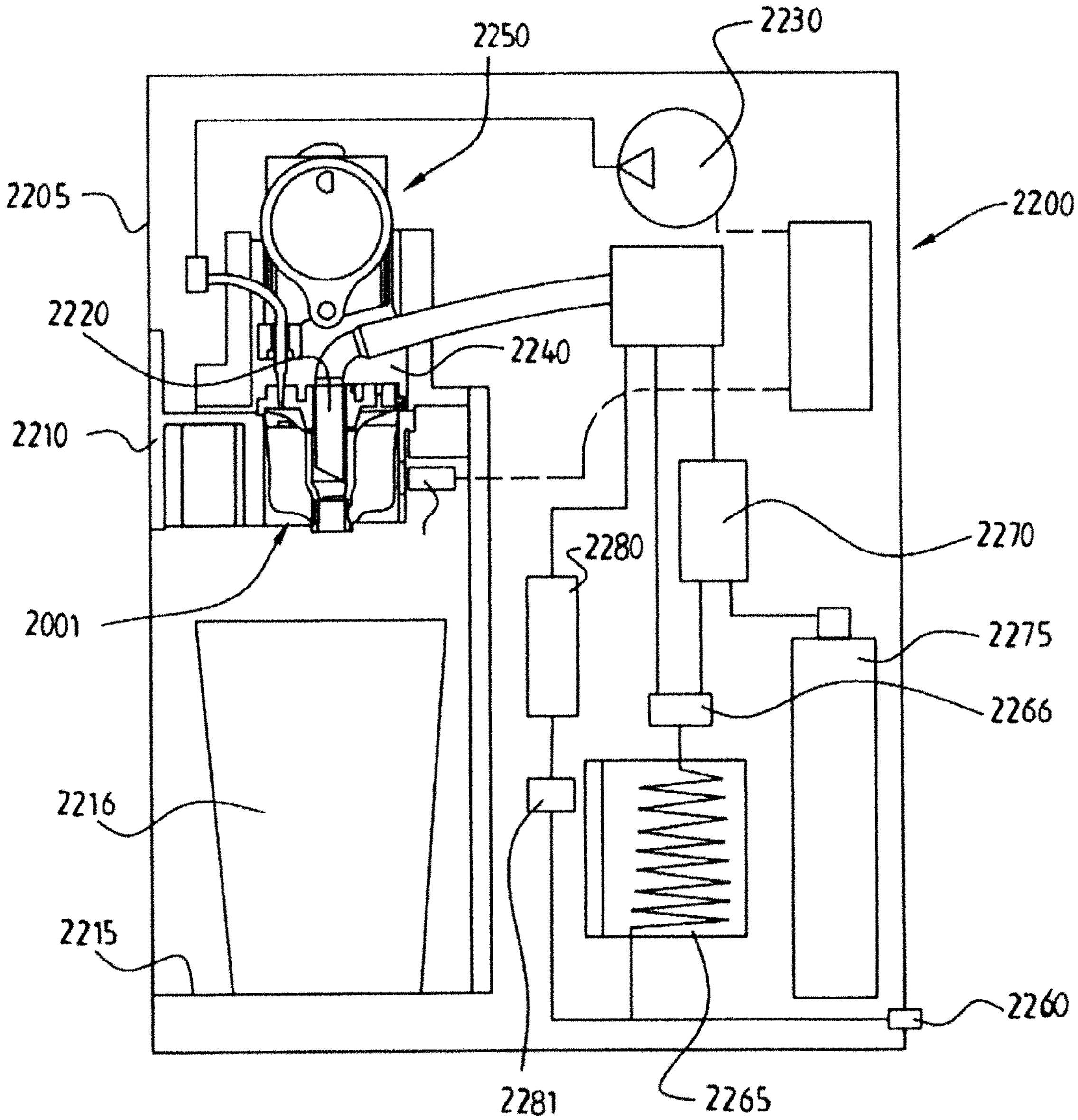
Figure 31:
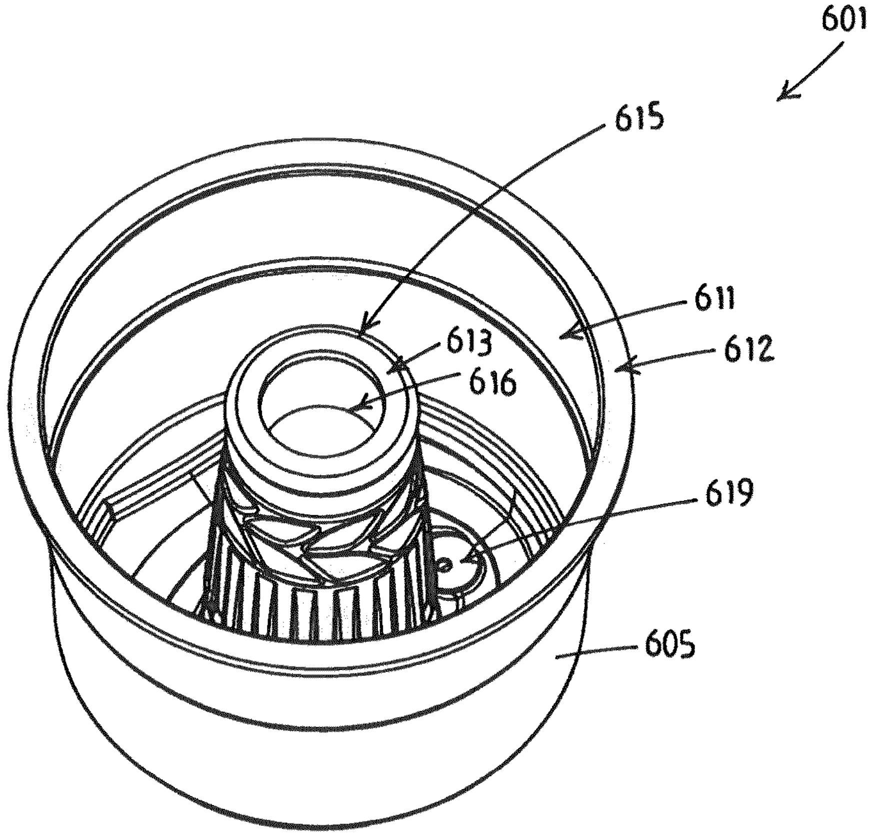
Figure 32:
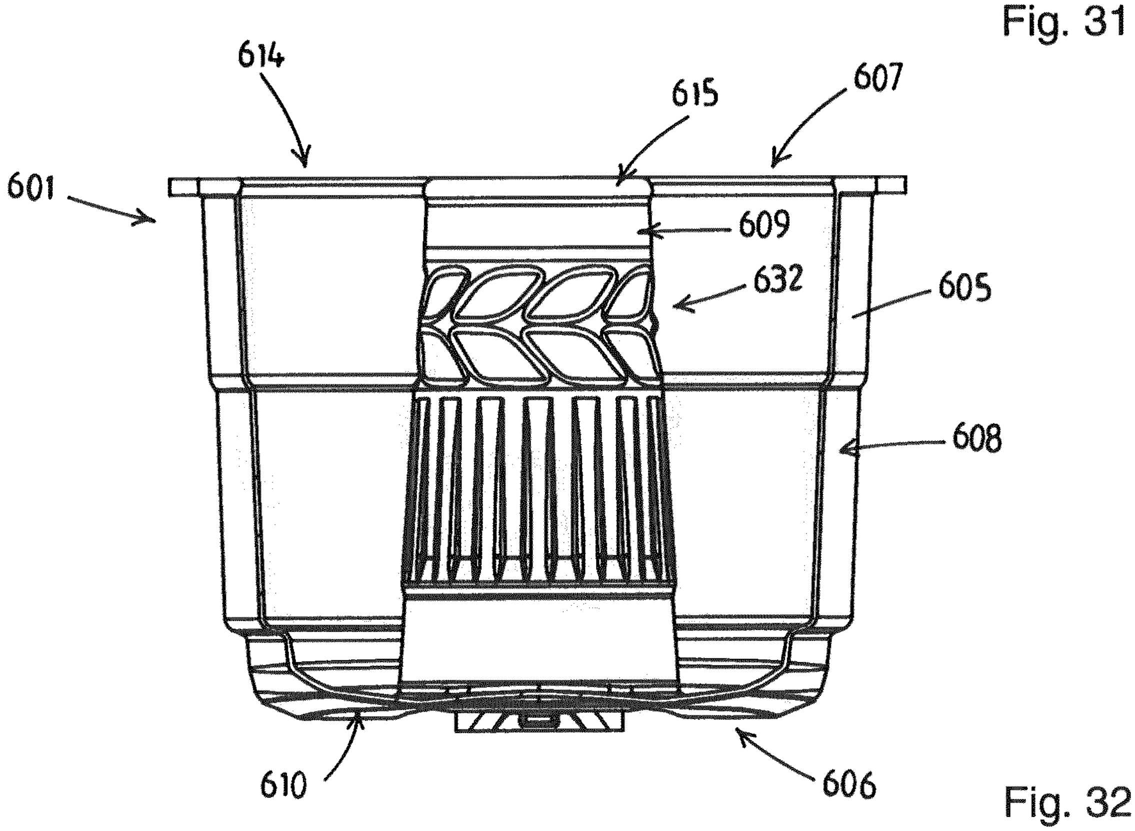
Figure 33:
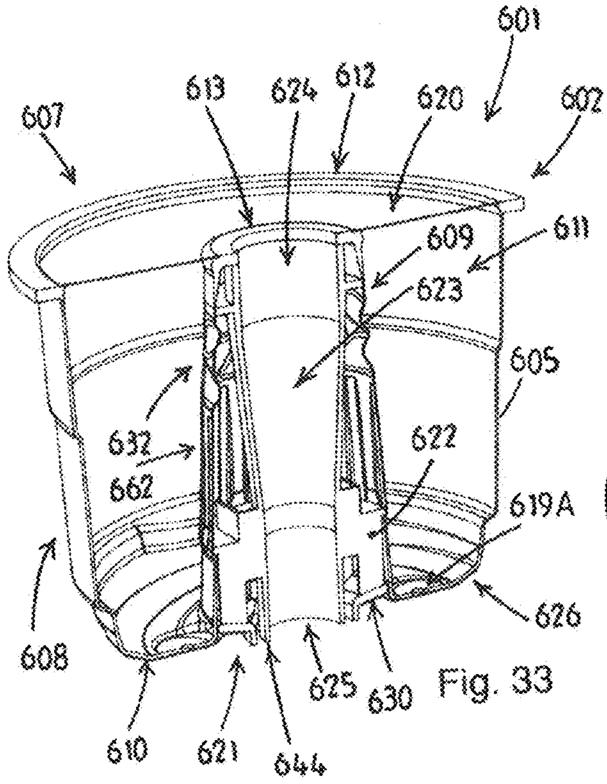
Figure 34:
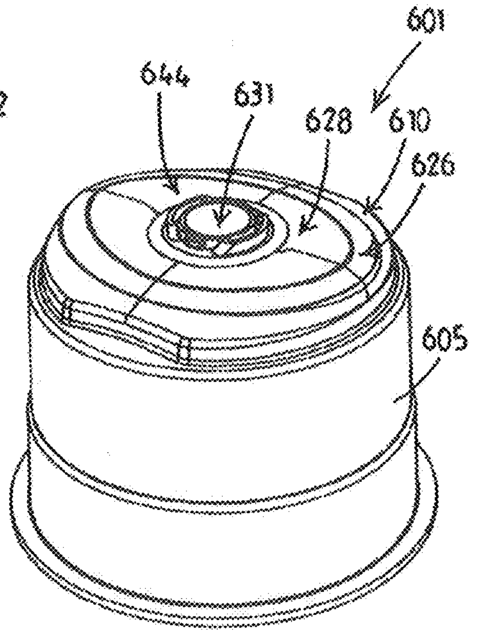
Figure 35:
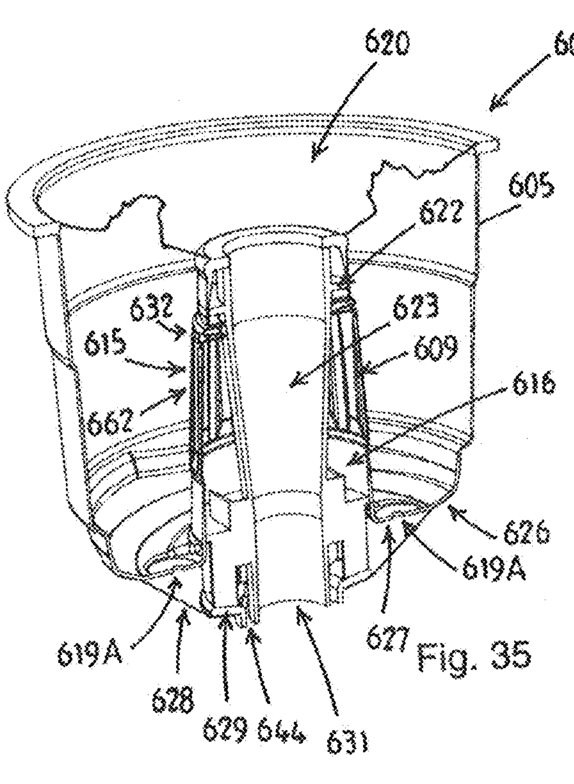
Figure 36:
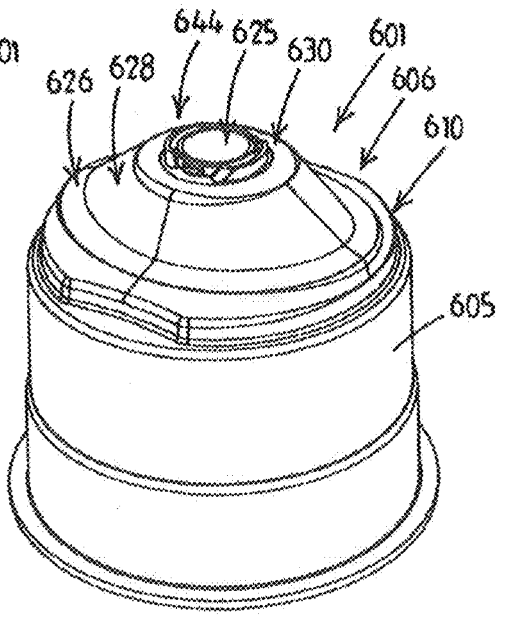

FIG. 25 shows in perspective view components of a liquid food product dispenser and the cartridge of FIG. 1 prior to placement in a cartridge holder of the apparatus, FIG. 26 shows the view of FIG. 25 with the cartridge placed in the cartridge holder, FIG. 27 shows the view of FIG. 25 with the cartridge holder moved to bring the cartridge to a dispensing location relative to the apparatus, FIG. 28 shows a cross section of the apparatus and cartridge in the situation of FIG. 27, prior to the start of a dispensing cycle, FIG. 29 shows the apparatus and cartridge in the situation wherein the pressurization dome member and liquid feed lance have been moved downwards to engage on the cartridge and the valve member respectively, with the valve member in its lowered dispensing position;

FIG. 30 shows schematically a beverage dispensing apparatus with a cartridge in opened condition FIG. 31 shows a perspective top view of a capsule body of a sixth exemplary embodiment of a cartridge according to the invention;

FIG. 32 shows a side view in partial cross section of the capsule body of FIG. 31;

FIG. 33 shows a perspective view in cross section of the cartridge of FIGS. 31-32, with a nozzle received in the capsule body, in a first position;

FIG. 34 shows a perspective bottom view of the cartridge of FIG. 33;

FIG. 35 shows a perspective view in cross section of the cartridge of FIG. 31, with the nozzle received in the capsule body, in a second position; and FIG. 36 shows a perspective bottom view of the cartridge of FIG. 35.

In the FIGS. 1-5 show a first exemplary embodiment of a cartridge 1 for providing a liquid product according to the invention.

The cartridge 1 comprises a sealed capsule 2 and a nozzle 21.

The sealed capsule 2 shown is to be filled with a portion of a liquid ingredient, which liquid ingredient is to be combined with a base liquid for the preparation of the liquid product, e.g. a beverage concentrate to be combined with water, e.g. carbonated water, for the preparation of a beverage.

The sealed capsule comprises a capsule body 5, a top seal 20, and, in the particular embodiment shown, a bottom seal 28. The capsule body 5 is shown in isolation in FIG. 1 and FIG. 2.

The capsule body 5 has a bottom 6 and a top 7, and further comprises an outer circumferential wall 8, an inner circumferential wall 9 and a bottom wall 10. The walls delimit an annular reservoir 11 between them, The inner circumferential wall 9 and the outer circumferential wall 8 are at a top end respectively provided with an inner sealing surface 13 and an outer sealing surface 12, the sealing surfaces 12, 13 delimiting a reservoir access opening 14 between them.

The top seal 20, in the particular embodiment shown a top sealing film, is sealed to the inner sealing surface 13 and the outer sealing surface 12. The top seal 20 covers the reservoir 11, and hermetically seals the reservoir access opening 14.

The inner circumferential wall 9 forms a column 15, the column having an internal cavity 16 that extends between an upper opening 17, at a top of the column, and a bottom opening 18 at a bottom end of the column.

In the particular embodiment shown in FIGS. 1-5, the upper opening 17 is encircled by the inner sealing surface 13. The top seal 20 is sealed to the inner sealing surface, and thus to the top of the column 15.

According to the invention, the bottom wall 10 of the capsule body 7 is provided with at least one reservoir outlet 19. In the particular embodiment shown in FIGS. 1-5, the reservoir outlet 19 is provided in the form of two apertures 19A, which apertures are located on opposite sides of the column 15. The apertures are sealed with a bottom seal 28.

Furthermore, with the embodiment shown in FIGS. 1-5, the capsule body 4, on a bottom surface of the bottom wall 10, provided with a peripheral sealing surface 26 and an aperture sealing surface 27, the aperture sealing surface encircling the reservoir outflow aperture 19A. The aperture sealing surface 27 is located between the peripheral sealing surface 26 and the bottom opening 18 of the column 15.

The bottom seal 28 is releasable sealed to the aperture sealing surface 27, and hermetically seals the reservoir outflow aperture 19A. The bottom seal 28 is furthermore fixed to the peripheral sealing surface 26, and to the nozzle 21.

Figure 3:
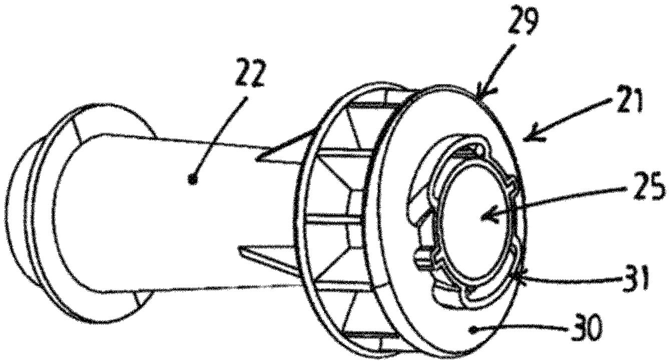
FIG. 3 shows a perspective view of a nozzle of a cartridge according to the invention.

The cavity 16 holds the nozzle 21, shown in isolation in FIG. 3, which nozzle is configured for guiding a flow of base liquid, e.g. water, through at least part of the cavity 16, and for dispensing the base liquid at a bottom side of the capsule.

The nozzle 21 comprises a nozzle body 22, the nozzle body having a channel 23 extending between an inlet opening 24 at a top end of the nozzle and an outlet opening 25 at a bottom end of the nozzle.

Figure 4:
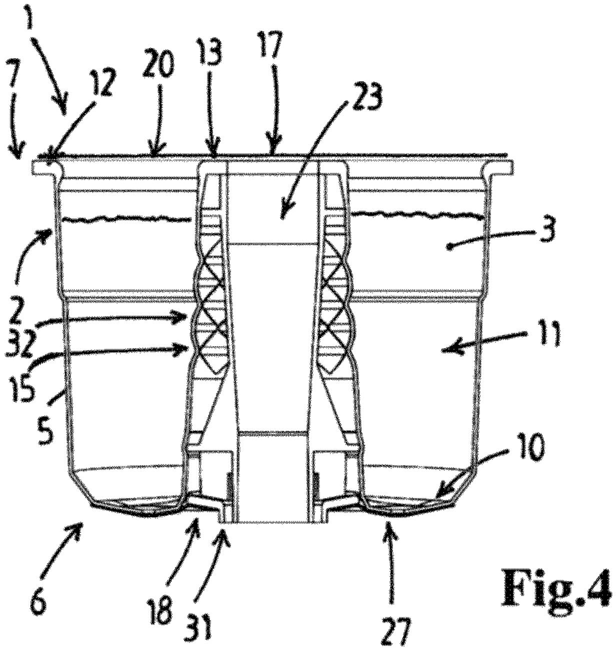
FIG. 4 shows a side view in cross section of the cartridge of FIGS. 1-3, with the nozzle received in the capsule body, in a first position.
Figure 5:
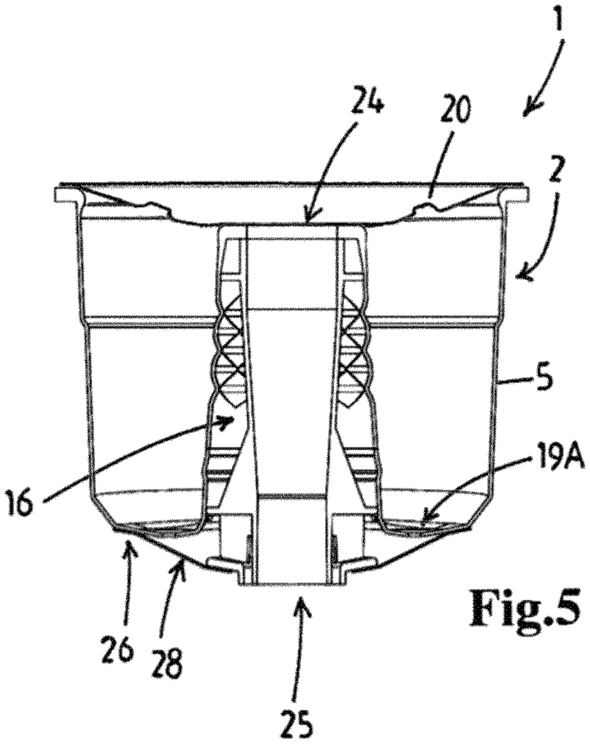
FIG. 5 shows a side view in cross section of the cartridge of FIGS. 1-3, with the nozzle received in the capsule body, in a second position.
Figure 6:
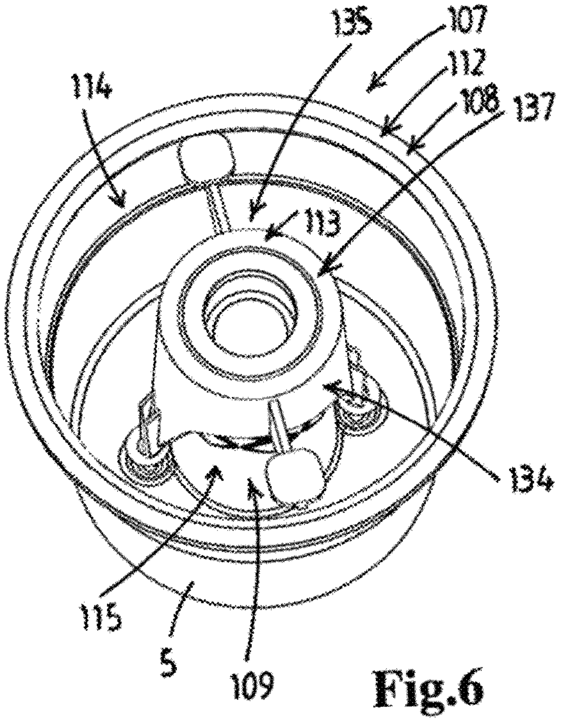
FIG. 6 shows a perspective top view of a capsule body and a bottom piercer received a reservoir defined by a capsule body of a second exemplary embodiment of a cartridge according to the invention.
Figure 7:
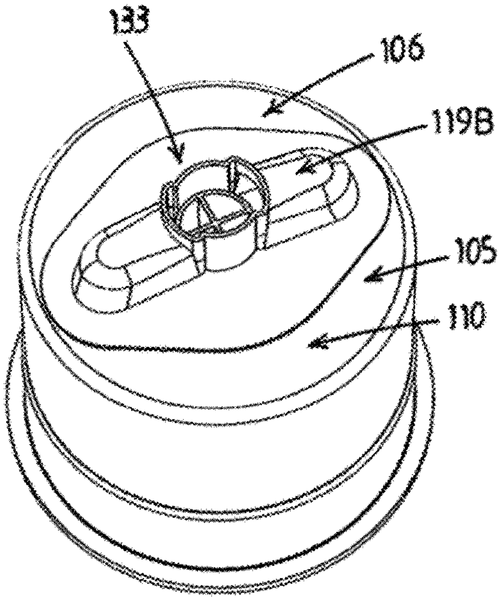
FIG. 7 shows a perspective bottom view of the capsule body of FIG. 6.

The nozzle 21 is moveable, relative to the outer circumferential wall 8 of the capsule body 5, and relative to the bottom portion of the column, from a raised passive position, shown in FIG. 4, into a lowered dispensing position, shown in FIG. 5.

In the embodiment shown in FIGS. 1-5, the nozzle 21 furthermore has a flange 29 at the bottom end. The flange 29 has a sealing surface for the bottom seal 28 and has two outflow apertures 44. The outflow apertures 44 penetrate the flange 29 of the nozzle near the outlet opening 25 of the nozzle, for dispensing liquid ingredient at, or adjacent to, the flow of base liquid exiting, i.e. being dispensed from, the outlet opening 25.

The bottom seal 28 is fixed to the sealing surface 30 on the flange 29 of the nozzle. When the nozzle 21 is moved into the dispensing position, in the embodiment shown by compressing the column 15, the nozzle pulls the bottom seal 28 away from the outflow apertures 19A in the bottom wall of the capsule, enabling liquid ingredient to flow out of the reservoir. The bottom seal 28 remains attached to the peripheral sealing surface 26 of the bottom wall 10 of the capsule body 5

Thus, when the nozzle 21 is in the dispensing position, the bottom seal 28 remains attached to the peripheral sealing surface 26 of the bottom wall 10 of the capsule body 5 and to the sealing surface 30 of the nozzle 21, enabling the liquid ingredient to flow along the bottom seal 28 from the outflow apertures 19A in the bottom of the capsule to the dispensing apertures 44 in the flange 29 of the nozzle 21.

The cartridge shown in FIGS. 1-5 is thus configured to simultaneously dispense a flow of base liquid, via the channel in the nozzle, and two flows of liquid ingredient, from the reservoir, as unmixed flows at a bottom of the cartridge.

Furthermore, the dispensing apertures 44 of the nozzle 21 are positioned adjacent the inner wall that defines the channel in the column, i.e. the channel through which the base liquid is to be dispensed, such that the flows of liquid ingredient are dispensed adjacent the flow of base liquid, and the flows of liquid ingredient preferably adhere to the flow of base liquid. The liquid ingredient and the base liquid are mixed when the flows hit a container, e.g. a drinking glass, for holding the beverage. Thus, the turbulence created in the container by the flows being dispensed is used for mixing the flows. Compared with traditional set ups, in which a base liquid and liquid ingredient are typically mixed in a mixing chamber prior to being dispensed, a cartridge according to the invention allows for mixing a base liquid and a liquid ingredient with a minimum of turbulence in the flows. This is in particular beneficial when dispensing beverages comprising carbonated water. Because of the reduced turbulence during the dispensing process, less CO2 is separated from the water, and a beverage comprising a comparatively large CO2 content can be obtained.

In the embodiment shown in FIGS. 1-5, the cartridge is configured such that movement of the top end of the column opens the capsule. The combination of a sealed capsule body provided with a nozzle allows for the capsule body to have a simple shape.

The capsule has a centre column with a top end that can be pushed downward. In the embodiment shown, the column 15 is a collapsible column, i.e. the inner circumferential wall 9 is configured to buckle when the top end of the column is pressed downwards towards the bottom end of the column.

In the embodiment shown in FIGS. 1-5, pushing the top end of the column moves the nozzle into the lowered dispensing position. Thus, the downward movement of the top end of the column makes that the bottom seal, sealed to the bottom end of the nozzle, is pulled away from the outflow aperture. The capsule does not require a complicated capsule body or external piercing device for opening the reservoir, more in particular for opening the capsule.

The capsule body having a simple shape allows for the capsule body, and thus for the walls of the capsule body, to be a multi-layer material. Furthermore, the simple shape of the capsule body is suitable for being provided by way of thermoforming. Thermoforming allows for using laminated materials, and thus provide a capsule body having improved barrier properties against low costs.

As such, the cartridge is configured to provide a capsule, more in particular a sealed reservoir, for holding an ingredient, which capsule has barrier properties fit the particular base ingredient to be held in the reservoir.

It is submitted that in the embodiment shown in FIGS. 1-5, the sealed capsule 2 is provided with a diamond shaped bottom seal 28. In such an embodiment, the capsule body is provided with two outflow openings in its bottom wall, which outflow openings are provided on opposite sides of the column, and with a diamond shaped bottom seal.

The diamond shaped bottom seal has a central opening, through which a bottom end of the nozzle may protrude. The seals is at its circumference sealed to the bottom of the capsule body, and along its central opening to a flange of the nozzle. The seal is furthermore sealed to the bottom wall of the capsule body around the outflow apertures of the reservoir.

In the preferred embodiment shown in FIGS. 1-5, the bottom of the capsule body is provided with an annular shaped recess, serving as a base to which the diamond shaped seal is fixed. The recess extends below the part of the bottom wall in which the reservoir outflow apertures are provided, and serves as a base to which the diamond shaped bottom seal is fixed. Thus, the outer end of the seal is spaced, in a direction perpendicular to the bottom wall in which the sealed outflow apertures are provided, which promotes the peeling away of the bottom seal from the outflow apertures when the nozzle is moved into the downward direction.

It is submitted that in the embodiment shown, the recess is diamond shaped because there are two outflow apertures provided on opposite sides of the column. It is submitted that the recess may have different shapes, for example be circular, and may be used in combination with different numbers of outflow apertures. For example, the recess may be triangular shaped in combination with three outflow apertures, each outflow aperture being located in a point of the triangle.

In these embodiments, the capsule is opened by pushing part of the nozzle out of the column of the capsule body, the nozzle thus pulling the centre of the bottom seal away from the bottom wall of the capsule body, and thus opening the outflow apertures of the reservoir.

Subsequently, the seal, still being sealed at its peripheral edge to the recess of the bottom of the capsule, and along its central opening to the nozzle, functions as a guide for the liquid ingredient being dispensed from the reservoir. The seal guides the liquid ingredient to the outlet opening of the nozzle, i.e. the opening at which the water is dispensed, such that the liquid ingredient can be dispensed parallel and adjacent to the flow of water.

It is submitted that the diamond shape of the seal, in combination with the two outflow openings of the reservoir, makes that the seal forms an optimal guide for the liquid ingredient. The diamond shape causes the seal to form guide channels, directed from below the reservoir outflow apertures towards the nozzle. The surface of the seal is slanted towards the centre of the guide channels and towards the nozzle. Thus, all liquid ingredient is guided towards the dispense opening, and the risk of liquid ingredient remaining in the guide channel, i.e. not being dispensed, is reduced.

In a preferred embodiment, the capsule body is a made out of a multi-layer material, preferably is thermoformed out of a sheet of multi-layer material, such that the walls of the capsule comprises multiple layers of different materials, the materials having different barrier properties.

FIGS. 6-9 show a second exemplary embodiment of a cartridge for providing a liquid product according to the claimed invention.

The cartridge comprises a sealed capsule 102, a bottom piercer 134 and a guide member 133.

Similar to the sealed capsule 2 shown in FIGS. 1-5, the sealed capsule comprises a top seal 120, e.g. a top sealing film.

The sealed capsule 102 differs from the sealed capsule 2 disclosed in FIGS. 1-5 in that the capsule is not provided with a bottom seal. Furthermore, the at least one reservoir outlet is provided in the form of a pierceable bottom area 119B, instead of sealed apertures 19A.

To dispense the liquid ingredient from the reservoir the pierceable bottom areas are to be pierced by the bottom piercer 134.

Similar to the sealed capsule 2 shown in FIGS. 1-5, the sealed capsule 102 shown in FIGS. 6-9, the capsule body 105 has a bottom 106 and a top 107, and further comprises an outer circumferential wall 108, an inner circumferential wall 109 and a bottom wall 110. The walls delimit an annular reservoir 111 between them, The inner circumferential wall 109 and the outer circumferential wall 108 are at a top end respectively provided with an inner sealing surface 113 and an outer sealing surface 112, the sealing surfaces 112, 113 delimiting a reservoir access opening 114 between them.

The top seal 120, in the particular embodiment shown a top sealing film, is sealed to an inner sealing surface 113 and an outer sealing surface 112. The top seal 120 thus covers the reservoir 111, and hermetically seals the reservoir access opening 114.

The inner circumferential wall 109 forms a column 115, the column having an internal cavity 116 that extends between an upper opening 117, at a top of the column, and a bottom opening 118 at a bottom end of the column.

In the particular embodiment shown in FIGS. 6-9, the upper opening 117 is encircled by the inner sealing surface 113. The top seal 120 is sealed to the inner sealing surface, and thus to the top of the column 115.

According to the invention, the bottom wall 110 of the capsule body 105 is provided with at least one reservoir outlet 119. In the particular embodiment shown in FIGS. 6-9, the reservoir outlet 119 is provided in the form of two apertures 119B, which apertures are located on opposite sides of the column 115.

The cavity 116 holds the nozzle 121, which nozzle is configured for guiding a flow of base liquid, e.g. water, through at least part of the cavity 116, and for dispensing the base liquid at a bottom side of the capsule.

The nozzle 121 comprises a nozzle body 122, the nozzle body having a channel 123 extending between an inlet opening 124 at a top end of the nozzle and an outlet opening 125 at a bottom end of the nozzle.

Figure 8:
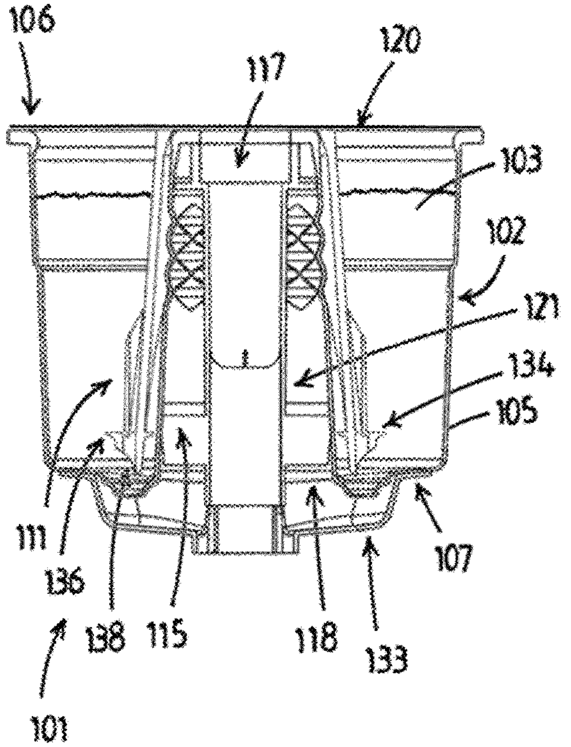
FIG. 8 shows a side view in cross section of the cartridge of FIGS. 6-7, with the bottom piercer in a first position.
Figure 9:
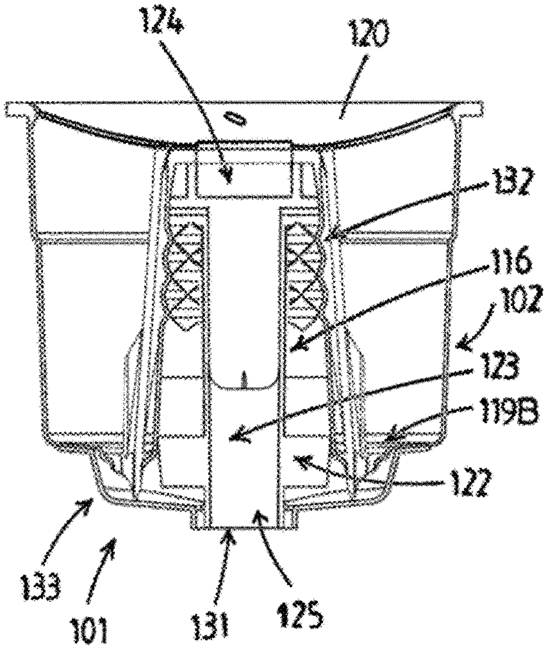
FIG. 9 shows a side view in cross section of the cartridge of FIGS. 6-7, with the bottom piercer in a second position.

The nozzle 121 is moveable, relative to the outer circumferential wall 108 of the capsule body 105, from a raised passive position, shown in FIG. 8, into a lowered dispensing position, shown in FIG. 9.

In the embodiment shown in FIGS. 6-9, the capsule body is provided with a collapsible column, i.e. the column 115 is provided with a buckle area 132, which buckle area 132 is configured to collapse when pressure is exerted on the top of the column. Thus, similar to the first embodiment shown in FIGS. 1-5, the inner circumferential wall is configured to buckle when the top end of the column is pressed downwards towards the bottom end of the column, while the bottom of the capsule body remains in place. Therefore, the column is provided with an annular buckling portion, comprising faceted area that promote local collapse of the column.

In an alternative embodiment, the movement of the nozzle from a raised passive position into a lowered dispensing position is enabled by the column as a whole being moveable relative to the circumferential wall of the capsule body. In such an embodiment, the bottom of the capsule body is provided with an annular flexible bottom portion around the column.

The top seal 120 is sealed to an inner sealing surface 113 and the outer sealing surface 112 and covers the reservoir 121. The top seal 120 hermetically seals the reservoir access opening 114.

The bottom piercer 134 has a top end 135 and a bottom end 136, and is provided with an activation surface 137 at the top end and piercing members 138 at a bottom end thereof.

The bottom piercer 134 is located in the reservoir 111 of the capsule body 105. The activation surface 137 of the bottom piercer 134 is located at, or is adjacent to, the top end of the column 115. The piercing members 138 of the bottom piercer 134 are located at, or adjacent to, the bottom end of the column 115, and above the pierceable bottom areas 119B.

In the particular embodiment shown, the bottom piercer 134 is provided with two top seal opener members that are connected to the bottom piercer, e.g. so as to move down along with the bottom piercer. The top opener members each engage, e.g. are adhered to, the top seal at one or more areas that each are located in between the inner circumferential wall and the outer circumferential wall. Upon moving the bottom piercer down from its initial position to a lowered position, in which the reservoir outlet is pierced, the top seal opener members cause the top sealing film to be locally overstressed and thereby rupture and provide said one or more gas pressure introduction openings.

Pushing the bottom piercer 134 in a downward direction makes the piercing members 138 pierce the pierceable areas 119B of the bottom 106 of the capsule, thus enabling liquid ingredient to flow out of the reservoir outlets 119.

It is noted that in the preferred embodiment shown in FIGS. 6-9, the bottom piercer is pushed downward by pushing the activation surface 137 of the bottom piercer 134. Furthermore, the bottom piercer 134 is mounted over the collapsible column 115 such that the activation surface 137 of the bottom piercer is located adjacent the inner sealing surface 113 at the top of the collapsible column. This facilitates the column 115 and the bottom piercer 134 to be engaged, and pressed downward, simultaneously. Thus, the bottom areas 119B are pierced while the nozzle 121 is moved into the lowered dispensing position. Furthermore, the collapsible column 115 keeps the bottom piercer 134 centred relative to the pierceable bottom areas 119B, in particular while the bottom piercer is pressed down.

In the particular embodiment shown, the reservoir outlets 119 are provided in the form of pierceable bottom areas 129B. In an alternative embodiment, the reservoir is provided with reservoir outlets in the form of apertures sealed with a bottom seal, and the bottom piercer is used to pierce those bottom seals instead of a pierceable bottom area of the capsule.

In the preferred embodiment shown, the cartridge 101 is provided with a guide member 133, attached to the bottom 106 of the sealed capsule 102 and extending from below the pierceable bottom areas 119B, for receiving liquid ingredient flowing from the reservoir outlet, towards and below the bottom opening 118 of the column 115, to dispense the liquid ingredient at or adjacent the flow of base liquid exiting the outlet opening 125 of the nozzle 121, when in the latter is in the lowered dispensing position, shown in FIG. 9.

In the preferred embodiment shown, the guide member 133 and the nozzle 121 form a dispense aperture 144 between them, for dispensing the ingredient closely adjacent the liquid dispensed form the nozzle, preferably dispense the ingredient in the form of a shroud, said shroud coating the flow of liquid.

FIGS. 10-14 show a third exemplary embodiment of a cartridge for providing a liquid product according to the claimed invention.

The cartridge 201 comprises a sealed capsule 202 and a nozzle 221.

The sealed capsule 202 shown is to be filled with a portion of a liquid ingredient, which liquid ingredient is to be combined with a base liquid for the preparation of the liquid product, e.g. a beverage concentrate to be combined with water, e.g. carbonated water, for the preparation of a beverage.

The sealed capsule comprises a capsule body 205, a top seal 220, and, in the particular embodiment shown, a bottom seal 228.

The capsule body 205 has a bottom 206 and a top 207, and further comprises an outer circumferential wall 208, an inner circumferential wall 209 and a bottom wall 210. The walls delimit an annular reservoir 211 between them, The inner circumferential wall 209 and the outer circumferential wall 208 are at a top end respectively provided with an inner sealing surface 213 and an outer sealing surface 212, the sealing surfaces 212, 213 delimiting a reservoir access opening 214 between them.

Figure 10:
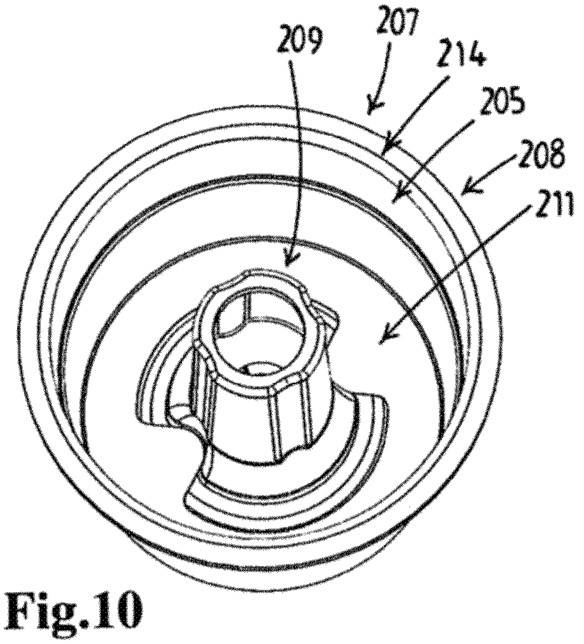
FIG. 10 shows a perspective top view of a capsule body with a bottom seal received in a reservoir defined by a capsule body of a third exemplary embodiment of a cartridge according to the invention.
Figure 11:
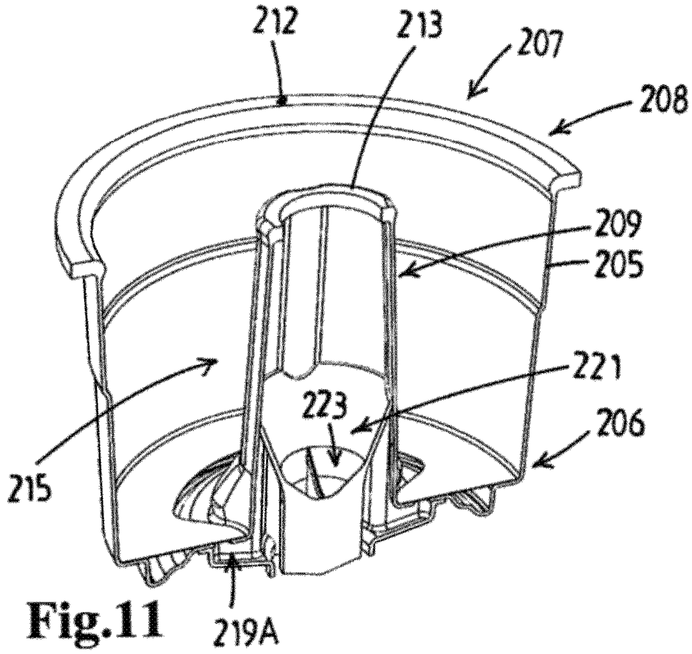
FIG. 11 shows a perspective side view in cross section of the cartridge of FIG. 10.

The top seal 220, in the particular embodiment shown a top sealing film, is sealed to the inner sealing surface 213 and the outer sealing surface 212. The top seal 220 covers the reservoir 211, and hermetically seals the reservoir access opening 214. FIGS. 10 and 11 depict the cartridge without the top seal.

The inner circumferential wall 209 forms a column 215, the column having an internal cavity 216 that extends between an upper opening 217, at a top of the column, and a bottom opening 218 at a bottom end of the column.

In the particular embodiment shown in FIGS. 10-15, the upper opening 217 is encircled by the inner sealing surface 213. The top seal 320 is sealed to the inner sealing surface, and thus to the top of the column 215.

Furthermore, in the particular embodiment shown, the bottom wall 210 of the capsule 202 has an annular flexible bottom portion 239 around the column 215 which flexible bottom portion enables the column 215 to be moved downwards from an initial position to a lower operative position.

According to the invention, the bottom wall 10 of the capsule body 207 is provided with at least one reservoir outlet 219. In the particular embodiment shown in FIGS. 10-14, the reservoir outlet 219 is provided in the form of two apertures 219A, which apertures are located on opposite sides of the column 215. The apertures are sealed with the bottom seal 228, which bottom seal 228 in the particular embodiment shown is provided inside the reservoir 211.

On a top surface of the bottom wall 210 the capsule 202 is provided with aperture sealing surfaces 240 for sealing the seal to the bottom of the capsule. The aperture sealing surfaces encircle the apertures to enable a leak tight sealing of the apertures.

In addition to the aperture sealing surfaces 240, in the embodiment shown, the bottom wall 210, on a top surface, is provided with a peripheral sealing surface 241. The peripheral sealing surface 210 extends along the circumference of the bottom wall 210.

In an alternative embodiment, depicted in FIGS. 15-20 the cartridge 301 is provided with a capsule 302 that comprises an insert 342 located in the reservoir 311 on or at the bottom wall 310 of the capsule 302, wherein the insert 342 is provided with the peripheral sealing surface 341, the peripheral sealing surface 341 extending along the circumference of the bottom wall 310. Compared to the embodiment shown in FIGS. 10-14, this alternative embodiment thus differs in the way that the bottom seal is sealed at its outer end or outer ends. However, the bottom seal is at the reservoir outlets sealed to the bottom wall, and the seal is removed from those reservoir outlets, similar to the way the bottom seal is to be removed in the embodiment shown in FIGS. 10-14, i.e. by pushing the column in a downward direction, i.e. towards the bottom wall.

The cavity 216 holds the nozzle 221. The nozzle 216 is configured for guiding a flow of base liquid, e.g. water, through at least part of the cavity 216, and for dispensing the base liquid at a bottom side of the capsule.

The nozzle 221 comprises a nozzle body 222, the nozzle body having a channel 223 extending between an inlet opening 224 at a top end of the nozzle and an outlet opening 225 at a bottom end of the nozzle.

Figure 12:
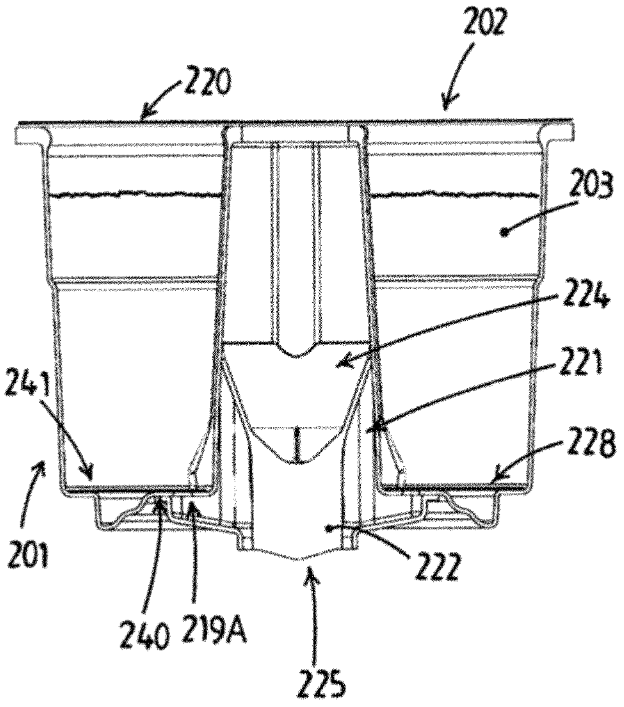
FIG. 12 shows a side view in cross section of the cartridge of FIG. 10 in a first position.
Figure 13:
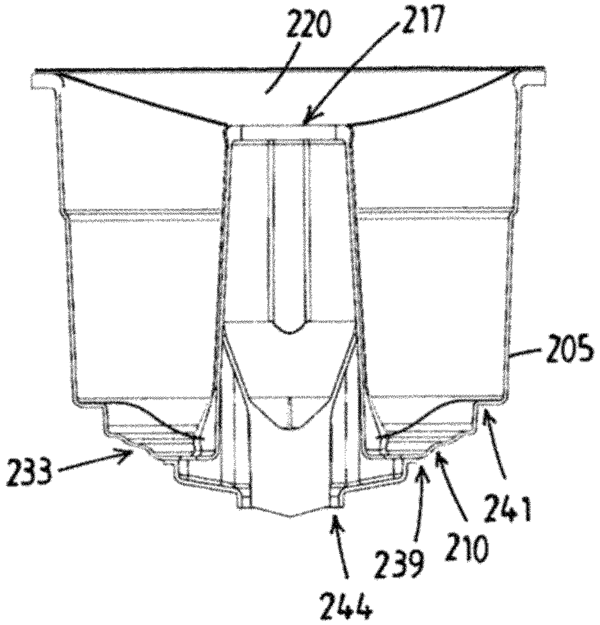
FIG. 13 shows a side view in cross section of the cartridge of FIG. 10 in a second position.
Figure 14:
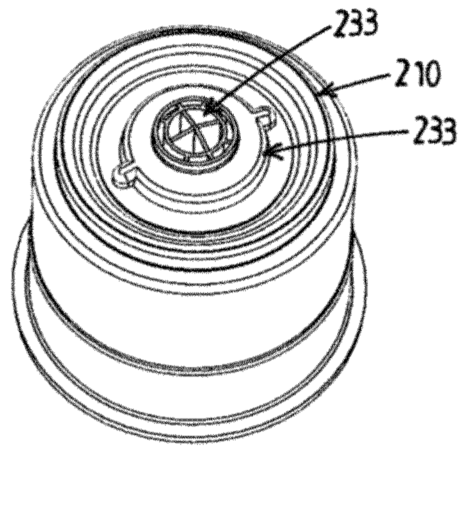
FIG. 14 shows a perspective bottom view of the capsule body of FIG. 10.
Figure 15:
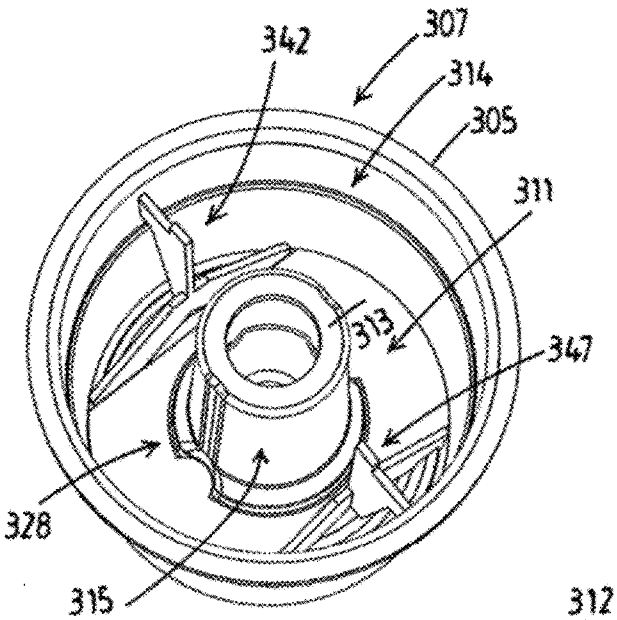
FIG. 15 shows a perspective top view of a capsule body with a bottom seal and an insert received in a reservoir defined by a capsule body of a fourth exemplary embodiment of a cartridge according to the invention.
Figure 16:
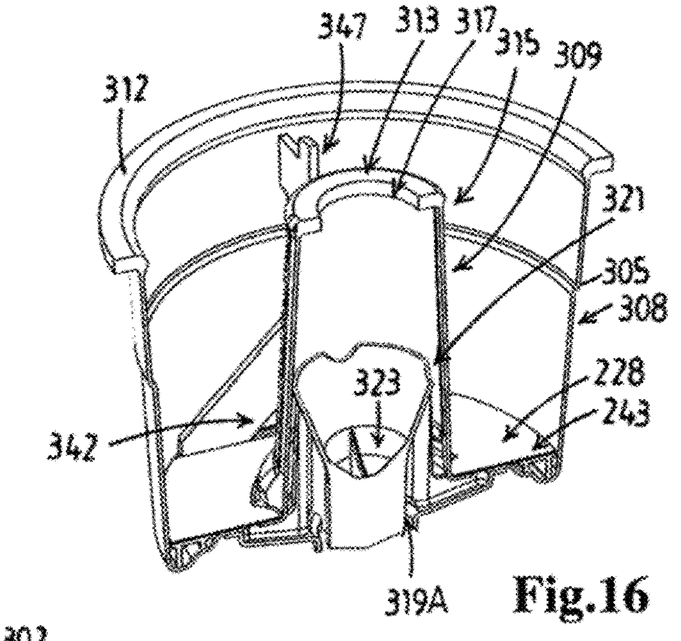
FIG. 16 shows a perspective side view in cross section of the cartridge of FIG. 15.
Figure 17:
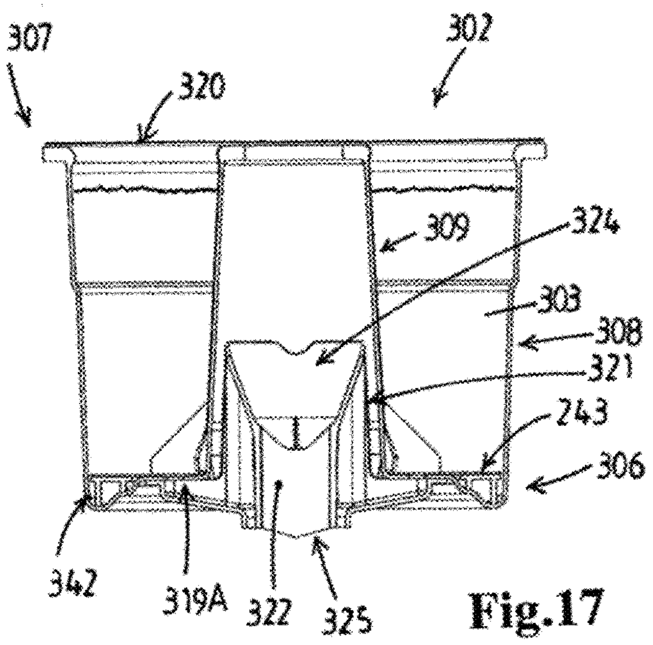
FIG. 17 shows a side view in cross section of the cartridge of FIG. 15 in a first position.
Figure 18:
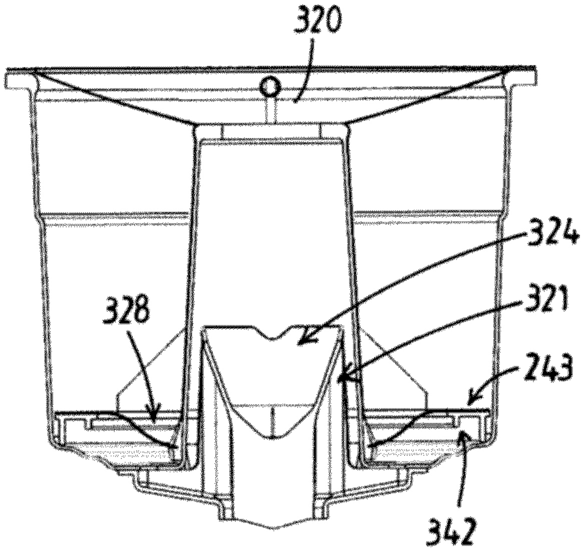
FIG. 18 shows a side view in cross section of the cartridge of FIG. 15 in a second position.
Figure 19:
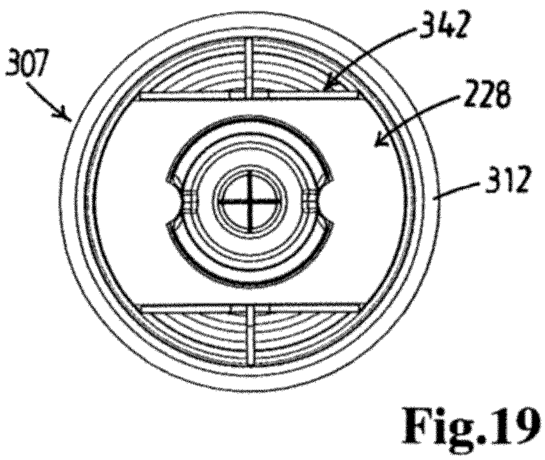
FIG. 19 shows a top view of the cartridge of FIG. 15.
Figure 20:
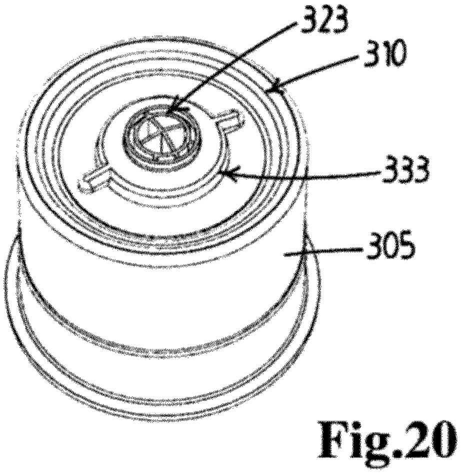
FIG. 20 shows a perspective bottom view of the capsule body of FIG. 10.
Figure 21:
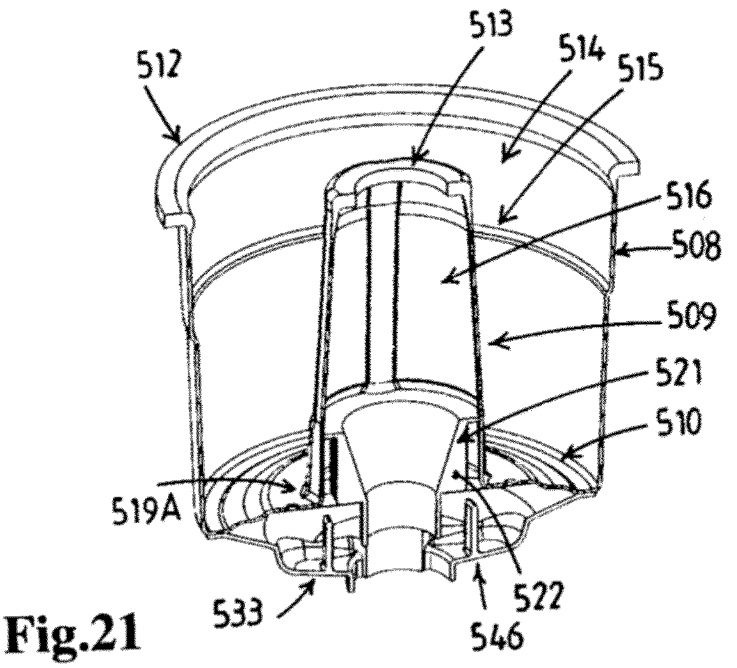
FIG. 21 shows a perspective side view in cross section of a capsule body with a bottom seal outside a reservoir defined by a capsule body and a guide member mounted to a bottom of the capsule body of a fifth exemplary embodiment of a cartridge according to the invention.
Figure 22:
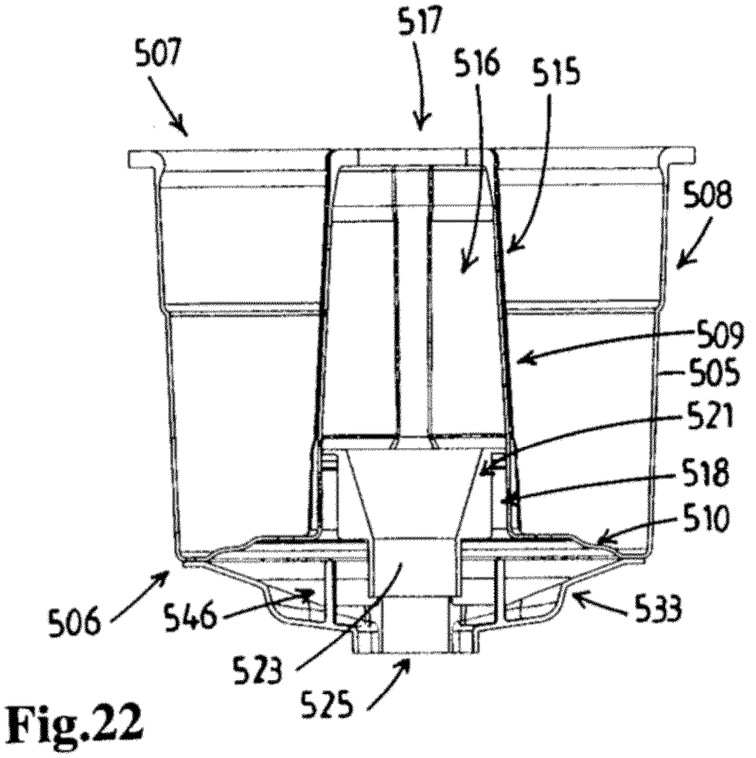
FIG. 22 shows a side view in cross section of the capsule body of FIG. 21.

In the embodiment shown, the nozzle 216 is moveable, with the column 215, relative to the outer circumferential wall 208 of the capsule body 205, from a raised passive position, depicted in FIG. 12, into a lowered dispensing position, depicted in FIG. 13.

The bottom seal 228 is releasable sealed to the aperture sealing surfaces 240, hermetically sealing the reservoir outlet, and is fixed to the peripheral sealing surface.

Pushing the column 215 in a downward direction from the initial position, depicted in FIG. 12, to the lower operative position, depicted in FIG. 13, pulls the aperture sealing surface 240, provided on top of the bottom wall 210, away from the bottom seal 228, enabling liquid ingredient to flow out of the reservoir outlets 219.

In the preferred embodiment shown, the cartridge is furthermore provided with a guide member 233, attached to the bottom of the capsule 202 and extending from below the reservoir outlets 219, for receiving liquid ingredient flowing from the reservoir outlets 219, towards and below the bottom opening 218 of the column 215, to dispense the liquid ingredient at or adjacent the flow of base liquid exiting the outlet opening 225 of the nozzle 321, when in the nozzle is in the lowered dispensing position.

In contrast with the embodiment shown in FIGS. 6-9, with the embodiments shown in FIGS. 10-20, the nozzle 221, 321 and the guide member 233, 333 are combined into a single component. The single component, comprising the nozzle and the guide member, is attached to the part of the bottom that moves with the column. Thus, the single component is in a fixed position relative to the column.

Similar to the embodiment shown in FIGS. 6-9, with the preferred embodiments shown in FIGS. 10-20, the nozzle 221, 321 and the guide member 233, 333 form a dispense aperture 244, 344 between them, for dispensing the ingredient closely adjacent the liquid dispensed form the nozzle, preferably dispense the ingredient in the form of a shroud, said shroud coating the flow of liquid.

In an alternative embodiment, the single component, comprising the nozzle and the guide member, is attached to the part of the bottom that does not moves with the column. Thus, the single component is in a fixed position relative to the outer circumferential wall of the capsule, while the column can be moved relative to the nozzle and the guide member.

In yet another alternative embodiment, the guide member and the nozzle are separate components, and the guide member is attached to the part of the bottom that does not move with the column while the nozzle is attached to the moveable column. Thus, the single component is in a fixed position relative to the outer circumferential wall of the capsule, while the nozzle can be moved with the column.

In the embodiment shown, the insert 342 is provided with two piercing elements 347, located on opposite sides of the column 315. The piercing elements 347 extend from the bottom of the capsule 302 up to the top seal 320. Once the top end of the column 315 is pushed downward, the piercing elements 347 pierce the top seal, to enable gas to be injected into the reservoir 311.

It is noted that in the embodiment shown, the bottom seal 328 has a rectangular shape. The bottom seal 328 does not cover the entire bottom wall 310 of the capsule 302. In the embodiment shown, the bottom seal 328 extends from one side of the column 315 to an opposite side of the column. In an alternative embodiment, the bottom seal may also comprise a first seal and a second seal, one provided on one side of the column sealing a first reservoir outlet, and one provided on an opposite side of the column, sealing the second reservoir outlet. Many other shapes of bottom seal are conceivable within the scope of the invention.

An alternative embodiment of a cartridge 501 according to the invention is depicted in FIGS. 21-24.

An alternative embodiment of a cartridge 501 for providing a liquid product is depicted in FIGS. 21-24. The cartridge 501 comprises a sealed capsule 502, a nozzle 521 and a guide member 533. The cartridge furthermore comprises a bottom seal 528, which bottom seal is provided on a bottom surface of the sealed capsule, between the capsule 502 and the guide member 533, which guide member is also mounted to the bottom surface of the sealed capsule.

The sealed capsule 502 is similar to the sealed capsules discussed above. It is filled with a portion of a liquid ingredient to be combined with a base liquid for the preparation of the liquid product, e.g. a beverage concentrate to be combined with water, e.g. carbonated water, for the preparation of a beverage.

The sealed capsule 502 comprises a capsule body 505 and a top seal 520.

The capsule body 505 has a bottom 506 and a top 507, and further comprises an outer circumferential wall 508, an inner circumferential wall 509 and a bottom wall 510. The walls delimit an annular reservoir 511 between them, The inner circumferential wall 509 and the outer circumferential wall 508 are at a top end respectively provided with an inner sealing surface 513 and an outer sealing surface 512, the sealing surfaces 512, 513 delimiting a reservoir access opening 514 between them.

The top seal 520, in the particular embodiment shown a top sealing film, is sealed to the inner sealing surface 513 and the outer sealing surface 512. The top seal 520 covers the reservoir 511, and hermetically seals the reservoir access opening 514.

The inner circumferential wall 509 forms a column 515, the column having an internal cavity 516 that extends between an upper opening 517, at a top of the column, and a bottom opening 518 at a bottom end of the column.

Figure 23:
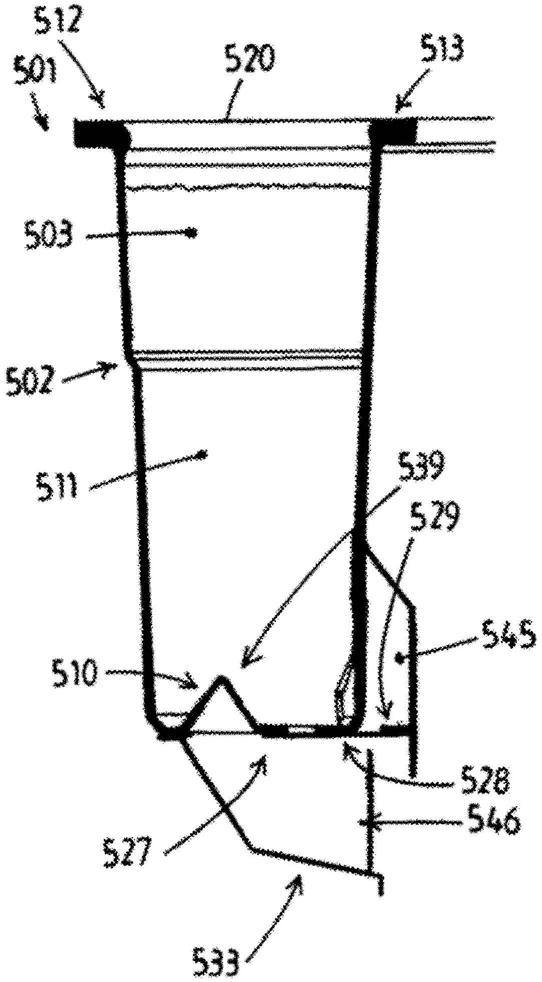
FIG. 23 shows a partial close up in cross section of the capsule body of FIG. 21 in a first position.
Figure 24:
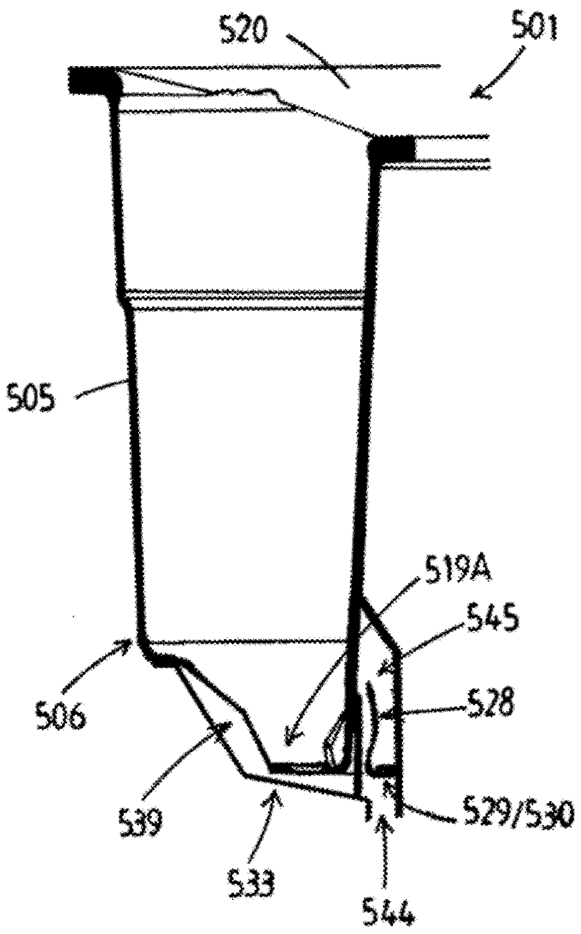
FIG. 24 shows a partial close up in cross section of the capsule body of FIG. 21 in a second position.

The bottom wall 510 has an annular flexible bottom portion 539 around the column 515 such that the column is movable downwards from an initial position, depicted in FIG. 23, to a lower operative position, depicted FIG. 24.

The cavity 516 holds the nozzle 521 which nozzle is configured for guiding a flow of base liquid, e.g. water, through at least part of the cavity 516, and for dispensing the base liquid at a bottom side of the capsule.

The nozzle 521 comprises a nozzle body 522, the nozzle body having a channel 523 extending between an inlet opening 524 at a top end of the nozzle and an outlet opening 525 at a bottom end of the nozzle.

The nozzle 521 is fixed in the bottom portion of the column 515, and thus moves with the column when the column is moved downwards from the initial position, depicted in FIG. 23, to the lower operative position, depicted FIG. 24. Thus, the nozzle is can be moved with the column, relative to the outer circumferential wall of the capsule body, from a raised passive position into a lowered dispensing position.

According to the invention, the bottom wall 510 of the capsule body 507 is provided with at least one reservoir outlet 519. In the particular embodiment shown in FIGS. 21-24, the reservoir outlet 519 is provided in the form of two apertures 519A, which apertures are located on opposite sides of the column 515. The apertures are sealed with a bottom seal 528.

Furthermore, with the embodiment shown in FIGS. 21-24, aperture sealing surfaces 527 are provided on a bottom surface of the bottom wall 510. The aperture sealing surfaces 527 encircle the reservoir outflow apertures 519A.

The bottom seal 528 is releasable sealed to the aperture sealing surfaces 527, and hermetically seals the reservoir outflow apertures 519A.

The bottom seal 528 is furthermore fixed to the nozzle 521. In the particular embodiment shown in FIGS. 21-24 the nozzle is provided, on a bottom surface, with a sealing surface 543. The sealing surface 543 is located in the cavity 516, such that a gap 545 is present between the inner circumferential wall 509 of the capsule body 505 and the sealing surface 543 provided on the nozzle 521. The gap 545 is located between the reservoir outlet 519 and the sealing surface 543 on the nozzle 521 such that the bottom seal 528 extends over the gab 545.

The guide member 533 is attached to the bottom of the sealed capsule 502, at or near the outer circumferential wall 508, such that the guide member 533 is in a fixed position relative to the outer circumferential wall 508, i.e. not moves with the column 515 when the column is moved downwards from the initial position to the lower operative position, and the nozzle is moved from the raised passive position into the lowered dispensing position.

The guide member 533 extends from below the reservoir outlet 519, for receiving liquid ingredient flowing from the reservoir outlet, towards and below the bottom opening 518 of the column 515, to dispense the liquid ingredient at or adjacent the flow of base liquid exiting the outlet opening of the nozzle 521, when the nozzle is dispensing position.

In this embodiment, the guide member 533 is provided with rib elements 546. The rib elements 546 extend in an upward direction towards the bottom seal 528 when the column 515 is in the initial position, depicted in FIG. 23. The rib element 546 engages the bottom seal 528 and is received in the gab 545, when the column pushed into the lower operative position, depicted in FIG. 24.

Thus, by moving the column 515, relative to the outer circumferential wall 508 of the capsule body 505, from the raised passive position into the lowered dispensing position, the rib elements 546 pull the bottom seal 528 away from the reservoir outlets 519 to enable liquid ingredient to flow out of the reservoir outlets.

In view of further appreciation of the cartridges depicted in FIGS. 1-24 and its cooperation with an appropriate dispensing apparatus, e.g. beverage preparation and dispensing apparatus, now the preparation of a beverage or other liquid product will be discussed with reference to FIGS. 25-30. It is noted that the cartridges discussed herein can be used in conjunction with the same apparatus and dispensing can be achieved on the basis of the same principles.

FIGS. 25-29 depict components of a dispensing apparatus 1100 including:

- a housing 1105,
- a holder 1110 that here is movable relative to the housing 1105, here a sliding drawer, for accommodating and retaining the cartridge 1 at a dispensing location in the apparatus,
- a base liquid feed assembly with a base liquid feed lance 1120 that is disposed at the dispensing location, which lance 1120 may be embodied to pierce through the top sealing film 20 of the cartridge 1 and is embodied to connect to the channel 23 of the nozzle 21 of the cartridge 1, so that base liquid can be fed into the channel 23.

The apparatus 1100 is provided with a pressurized gas source, preferably a pressurized air source, e.g. an air pump or gas bottle, here schematically depicted at 130.

The apparatus 1100 is adapted to bring the pressurized gas source 1130 in direct communication with the reservoir of the cartridge 1001, more in particular of the capsule, so as to allow the liquid ingredient therein to be pressurized by said gas thereby assisting the dispensing of the liquid from the reservoir when the nozzle 23 of the cartridge 1 has been brought into the dispensing position thereof.

This is advantageous if the liquid ingredient is rather viscous and also allows for control of said dispensing, e.g. in view of the ratio between the liquid ingredient and the base liquid, e.g. during a dispensing cycle of a single beverage. The gas pressure control may also be used to compensate, if needed, for any temperature dependent viscosity effect of the liquid ingredient, e.g. increasing gas pressure when the liquid ingredient is cold.

In an embodiment the apparatus may comprises a temperature sensor adapted to sense the temperature of the liquid ingredient and/or of the cartridge at the start of the dispensing cycle, e.g. when placed in the holder of the apparatus or when arriving at or moving to the dispensing location.

One can also envisage a user inputting said temperature, e.g. "cartridge taken from refrigerator" and "ambient temperature cartridge".

One can also envisage the top sealing film have a temperature responsive colouring area, that changes colour due to temperature change and thereby provides an indication of the actual temperature of the liquid ingredient. The apparatus may then have a sensor reading the temperature or an indicator thereof on the cartridge, or the user may be guided to provide the correct input for the apparatus.

The apparatus 1100 comprises a pressurization dome member 1140 having along a periphery thereof an outer gas seal 1146 that is adapted to sealingly engage the cartridge 1 around a location where the top sealing film is pierced to allow entry of pressurized gas into the reservoir. Here the outer gas seal 1146 is embodied to seal onto an outer sealing surface 12 of an outer circumferential wall 8 of the cartridge 1.

The pressurized gas source 1130 is connected to the dome member 1140 to allow feeding of pressurized gas beneath the dome member 1140 within the space sealed by the outer gas seal thereof that sealingly engages the cartridge. As the top sealing film has been opened, e.g. torn open by moving the top end of the column of the cartridge downward, this supply of pressurized gas, e.g. air, pressurized the liquid ingredient.

The base liquid feed lance 1120 here protrudes from the dome member 1140. The lance and the dome member 1140 are integrated to move in unison. The lance 1120 is provided with a gas seal 1146, here an O-ring, that seals onto the top end of the column to avoid entry of pressurized air into the channel.

The dispensing apparatus has an operable displacement device 1150, here with an excenter mechanism 1151 and an electric motor, which is adapted to produce a movement of the dome member 1140 and lance 1120 relative to the cartridge 1 that is held in the holder 1110.

When the displacement device 1150 is operated the lance 1120 may pierce the top sealing film 20 and will connect to the channel 23 of the nozzle 21. Continued downward motion of the lance 1120, here along with the dome member 1140, causes the base liquid feed lance to collapse part of the column, and move the top of the column 15 and thus the nozzle 21 to the dispensing position thereof, thus pressing the column and nozzle downwards from the raised position to the lower dispensing position thereof and thereby allowing the dispensing of beverage concentrate or the like from the cartridge 1, see FIG. 29.

The liquid feed assembly preferably is equipped for feeding in water as the base liquid, e.g. carbonated water, e.g. selectively carbonated and non-carbonated water, here via hose 1121. For example the liquid feed assembly comprise a pump for the base liquid and/or the liquid feed assembly is connected to a water mains, e.g. via an intermediate heat exchanger for cooling and/or heating said liquid, and/or via an intermediate carbonator for causing carbonization of the water.

The holder 1110 for the cartridge 1 is equipped to accommodate and retain the cartridge in a substantially horizontal position with the bottom downwards. The holder has an aperture below the bottom of the cartridge 1 in such a way that during dispensing of the liquid product said product remains clear of the holder. This avoids undue disturbance of the low, e.g. avoiding reduction of the carbon dioxide content of the liquid product and/or soiling of the apparatus and/or cross contamination between successive servings.

In the embodiment shown, the holder 1110 is a configured to support the cartridge below the flange of the cartridge only. In the embodiment shown, the holder is a drawer wherein the cavity for receiving the cartridge therein is completely free of a bottom or similar that supports the bottom of the cartridge. Thus, the cartridge has a bottom that is free hanging when the cartridge is in the holder.

At a distance below the dispensing location of the holder, the apparatus has a standing place for a mug or other receptacle, e.g. a drinking glass.

The user starts here by sliding open the drawer 1110 and placing the cartridge in a corresponding cavity in the drawer 1110. As is preferred the cartridge is now suspended from an upper flange as the holder forms a corresponding support surface for said upper flange. Now the user closes the drawer 1110 by sliding it with the cartridge 1 into the housing so that the cartridge is moved to the dispensing location of the apparatus 1100. This situation is depicted in FIGS. 25-27.

The displacement device 1150 is now operated so that the lance 1120 ruptures the top sealing film 20 and connects to the channel 23 of the nozzle 21. Continued downward motion of the lance 1120, here along with the dome member 1140, causes the base liquid feed lance to move the top end of the column 15 and thus the nozzle 21 to the dispensing position thereof, pressing the nozzle downwards from the raised position to the lowered dispensing position thereof and thereby allowing the dispensing of beverage concentrate or the like from the cartridge 1.

In the embodiment shown, the top seal 20 of the cartridge 1 is opened by the top end of the column, to the inner sealing surface 13 of which the top seal is sealed, being pressed downward relative to the outer circumferential wall, to the outer sealing surface 14 of which the seal is also sealed. The tension thus generated in the seal causes said seal to be torn open. In an alternative embodiment, piercing devices for piercing the top seal from the inside out can be provided in the reservoir. In yet another embodiment, the dispenser device may be provided with seal piercing devices.

As will be appreciated from a comparison of FIGS. 28 and 29, moving the upper portion of the column structure 15, here in combination with the nozzle 21, down from the initial position to the lower position, causes the top sealing film 6 to be locally overstressed and thereby rupture. The rupturing provides the desired one or more gas pressure introduction openings in the top sealing film 20.

In embodiment it is envisaged that the top sealing film 20 is pre-weakened at or near the one or more locations, e.g. with one or more premade score lines, e.g. made by laser scoring of the film.

The downward motion of the lance 1120 causes the base liquid feed lance to move the nozzle 21 to the dispensing position thereof, tears the bottom seal from the aperture sealing surface, thus opening the outflow apertures and allowing the liquid ingredient to flow from the reservoir of the capsule.

The diamond shape of the seal, in combination with the two outflow openings of the reservoir, makes that the seal forms an optimal guide for the liquid ingredient. The diamond shape causes the seal to form two guide channels, directed from below the reservoir outflow apertures towards the nozzle, more in particular towards dispensing apertures provided in the flange of the nozzle. The surface of the seal is slanted towards the centre of the guide channels and towards the nozzle.

Now the supply of carbonated water as well as of pressurized gas, e.g. air, is started, possibly with some timed delay of the one relative to the other. The liquid ingredient is now assisted in its travel through the outflow openings of the capsule body, from where it flows along the guide channels formed by the bottom seal towards the dispensing apertures in the nozzle. In this embodiment the liquid ingredient blends with the water travelling through the channel 23 after both the liquid ingredient and the water are dispensed from the nozzle at the bottom of the cartridge.

Once the single serving is prepared the flow of water or other base liquid is stopped. If desired some gas flow may be continued to fully empty the cartridge and/or to assure that the final drops of liquid ingredient, e.g. beverage concentrate, are discharged. This avoids loss of ingredient and soiling of the apparatus.

At the end of the dispensing cycle, the dome member 1140 and lance 1120 are moved to their initial position, clear from the cartridge 1, allowing the removal of the cartridge 1, hereby opening the drawer 1110 and taking out the cartridge.

FIG. 30 schematically shows a beverage dispensing apparatus 2200, similar to the one shown in FIGS. 25-29 with a cartridge 2001 in opened condition.

The apparatus has a housing 2205 and a holder 2210 for the cartridge, here a drawer, for accommodating and retaining the cartridge 2001 at a dispensing location in the apparatus. The dispensing location is directly above the support 2215 for a drinking glass 2216.

The apparatus 2000 comprises an air pump 2230 and a pressurization dome member 2240 having along a periphery thereof an outer gas seal that is adapted to sealingly engage the cartridge 2001 around a location where the top sealing film is apertured to allow entry of pressurized air from the air pump into the reservoir.

A base liquid feed lance 2220 is integrated with the dome member 2240 as a reciprocating unit, here vertically, driven by operable displacement device 2250, here with an excenter mechanism and an electric motor, which is adapted to produce a movement of the dome member 2240 and lance 2220 relative to the cartridge 2001 that is held in the holder 2210.

When the displacement device 2250 is operated the lance 2220 connects to the channel in the nozzle in the column of the cartridge 2001. Also—upon further motion of the lance 220—the column, or at least a top end thereof, is pressed downward to its dispensing position and in the process the nozzle is also moved downward.

The apparatus 2000 has a water inlet 2260 to be connected to a water mains. If desired the apparatus may comprise a water filter to filter the water flowing into the apparatus.

Reference numeral 2265 denotes a water chiller device to chill the water, e.g. to a temperature between 2 and 10 Celsius.

The outlet of the water chiller device 2265 is connected, via valve assembly 2266, on the one hand directly to the lance 2220 and on the other hand to a carbonator 2270, e.g. an inline or tankless carbonator. A CO2 bottle 2275 is also connected to the carbonator 2270 so that the CO2 can be dissolved in the chilled water and then fed to the lance 2220.

Reference numeral 2280 denotes a flow through water heater adapted to provide hot water to the lance 2220. The flow thereof is controlled by hot water valve 2281.

In embodiments, the air pump 2230 is adapted to create an air pressure of between 0.5 and 2.5 bars above the atmospheric pressure. In embodiments the air pump 2230 will create a predetermined air pressure dependent on a readable indication on the cartridge, e.g. by reading a barcode, preferably said pressure being constant over a dispensing cycle.

In an embodiment, a dispensing cycle for a glass of beverage, e.g. of about 250 ml, will take between 15 and 30 seconds.

In an embodiment, the volume ratio between the liquid ingredient and the base liquid may be between 1:4 and 1:10. For example, a 50 ml volume of liquid ingredient in the reservoir is combined with 200-250 ml of carbonated water to fill a drinking glass.

In an embodiment the dispensing flow rate of the liquid ingredient from the reservoir is substantially uniform over the dispensing cycle of the base liquid, e.g. about 2-3 ml per second.

The FIGS. 31-36 show a sixth exemplary embodiment of a cartridge 601 for providing a liquid product according to the invention. The cartridge is similar to the cartridge shown in FIGS. 1-5.

The cartridge 601 comprises a sealed capsule 602 and a nozzle 621, see FIGS. 33 and 35.

The capsule 602 comprises a capsule body 605, a top seal 620, and, in the particular embodiment shown, a bottom seal 628. The capsule body 605 is shown in isolation in FIG. 31 and FIG. 32.

The capsule body 605 has a bottom 606 and a top 607, and further comprises an outer circumferential wall 608, an inner circumferential wall 609 and a bottom wall 610. The walls delimit an annular reservoir 611 between them, which reservoir is to be filled with a portion of a liquid ingredient, e.g. a beverage concentrate, that is to be combined with a base liquid for the preparation of a liquid product The inner circumferential wall 609 and the outer circumferential wall 608 are at a top end respectively provided with an inner sealing surface 613 and an outer sealing surface 612, the sealing surfaces 612, 613 delimiting a reservoir access opening 614 between them.

The top seal 620, in the particular embodiment shown a top sealing film 620, is sealed to the inner sealing surface 613 and the outer sealing surface 612. The top seal 620 covers the reservoir 611, and hermetically seals the reservoir access opening 614.

The inner circumferential wall 609 forms a column 615, the column having an internal cavity 616 that extends between an upper opening 617, at a top of the column, and a bottom opening 618 at a bottom end of the column. The upper opening 617 is encircled by the inner sealing surface 613. The top seal 620 is sealed to the inner sealing surface, and thus to the top of the column 615.

The cavity 616 holds a nozzle 621, which nozzle is similar to the nozzle shown in isolation in FIG. 3. The nozzle 621 is depicted in cross section in FIGS. 33 and 35. The nozzle 621 is configured for guiding a flow of base liquid, e.g. carbonated water, through at least part of the cavity 616, and for dispensing the base liquid at a bottom side of the capsule. The base liquid is to be mixed with the liquid ingredient held in the reservoir.

The nozzle 621 comprises a nozzle body 622, and has a channel 623 for guiding a flow of base liquid. The channel 623 extends between an inlet opening 624 at a top end of the nozzle and an outlet opening 625 at a bottom end of the nozzle.

The nozzle 621 furthermore has a flange 629 at the bottom end. The flange 629 has a sealing surface for the bottom seal 628 and has two liquid ingredient dispensing apertures 644. The dispensing apertures 644 penetrate the flange 629 of the nozzle near the outlet opening 625 of the nozzle, for dispensing liquid ingredient at, or adjacent to, the flow of base liquid exiting, i.e. being dispensed from, the outlet opening 625 of the nozzle.

It is noted that in the embodiment shown, a wall section is provided in the dispensing apertures 644, dividing the dispensing apertures into two parallel channels located on opposite sides of the wall. In the figure, the cross section runs through the walls provided in the respective dispensing apertures. Thus, FIGS. 33 and 35 depict part of the walls and one of the two channels running along the wall.

The nozzle 621 is held in the column 615 and is moveable, with the top of the column, relative to the outer circumferential wall 608 of the capsule body 605. Thus, by pushing down the top end of the column 615, the nozzle 621 can be moved from a raised passive position, shown in FIG. 33, into a lowered dispensing position, shown in FIG. 35.

According to the invention, the bottom wall 610 of the capsule body 607 is provided with at least one reservoir outlet 619. In the particular embodiment shown in FIGS. 31-36, the reservoir outlet 619 is provided in the form of two apertures 619A, which apertures are located on opposite sides of the column 615. The apertures are sealed with a bottom seal 628.

Furthermore, with the embodiment shown in FIGS. 31-36, the capsule body 604 is provided with a peripheral sealing surface 626 and an aperture sealing surface 627 on a bottom surface of the bottom wall 610. The aperture sealing surface 626 encircles the reservoir outflow aperture 619A. The aperture sealing surface 627 is located between the peripheral sealing surface 626 and the bottom opening 618 of the column 615.

The bottom seal 628 is releasable sealed to the aperture sealing surface 627, and hermetically seals the reservoir outflow aperture 619A. The bottom seal 628 is furthermore fixed to the peripheral sealing surface 626, and to the sealing surface 630 on the flange 629 of the nozzle.

The capsule 602 has a centre column 615 with a top end that can be pushed downward. In the embodiment shown, the column 615 is a collapsible column, i.e. the inner circumferential wall 609 of the capsule body 605 is configured to buckle when the top end of the column is pressed downwards towards the bottom end of the column. The column is provided with a structure that promotes buckling. Furthermore, the buckling structure 632 is provided to localize the buckling of the column to a specific area.

In the embodiment shown the buckling structure comprises diamond shaped recesses, separated by linear ridges. The wall of the column is provided with recesses to locally reduce the capability of the wall to support the a load applied to the top of the column. The ridges between the recesses form rigid areas. When the top of the column is pushed downward, the wall of the column buckles at the recessed areas while the ridges separating the recesses more or less stay intact. Thus, the ridges are moved from an angled position towards a horizontal position, causing the recessed area between the ridges to fold onto itself. The column buckles and the top of the column moves downward towards the lowered end of the column.

In the embodiment shown, two rows of diamond shaped recesses are provided, wherein the ridges between the recesses of the upper row extend at an angle opposite to the angle of the ridges of the lower row. It is submitted that the buckling of the column using diamond shaped recesses causes the top of the column to rotate about a vertical axis. By providing the ridges of the lower and the upper row of diamond shaped recesses at opposite angles, the rotational movement caused by the upper row of diamond shaped recesses is counteracted by the rotational movement of the lower row of diamond shaped recesses. Thus, in the embodiment shown, the buckling causes no, or only minimal, rotation of the upper end of the column relative to the lower end of the column.

Furthermore, in the embodiment shown, a lower portion of the column 615 is provided with a reinforcing structure 662. This reinforcing structure 662 is provided to resists buckling of the column 615 when the top of the column is pressed downward, and thus further promotes confinement of the buckling to a specific area of the column.

In the embodiment shown, the reinforcement structure comprises ribs that extend in a direction parallel to a longitudinal axis of the column, when seen in side view. The ribs extending parallel to the direction of a force applied to the top of the column to move it in the downward direction, makes that the recesses resist buckling of the column.

In the embodiment shown in FIGS. 1-5, pushing the top end of the column moves the nozzle into the lowered dispensing position. Thus, the downward movement of the top end of the column makes that the bottom seal, sealed to the bottom end of the nozzle, is pulled away from the outflow aperture. The capsule does not require a complicated capsule body or external piercing device for opening the reservoir, more in particular for opening the capsule.

The cartridge 601 is depicted, without a top seal, in FIGS. 33 and 34 in a passive position and in FIGS. 35 and 36 in an active position. By pushing down the top of the column 615, the nozzle 621 is moved from the passive position into the dispensing position.

When the nozzle 621 is moved into the dispensing position, the nozzle pulls the bottom seal 628 away from the outflow apertures 619A in the bottom wall of the capsule, enabling liquid ingredient to flow out of the reservoir 611. The bottom seal 628 remains, along its periphery, attached to the peripheral sealing surface 626 of the bottom wall 610 of the capsule body 605.

Thus, when the nozzle 621 is in the dispensing position, the bottom seal 628 is along its periphery attached to the peripheral sealing surface 626 of the capsule body 5 and is at its centre attached to the sealing surface 630 of the nozzle 621. The bottom seal 628 thus forms a funnel for guiding liquid ingredient dispensed from the outflow apertures 619A in the bottom of the capsule to the two dispensing apertures 644 in the flange 629 of the nozzle 621.

The cartridge 601 shown in FIGS. 31-36 is thus configured to simultaneously dispense a flow of base liquid, via the base liquid outlet aperture 631 at the bottom end of the channel 623 of the nozzle 621, and two flows of liquid ingredient, via the dispensing apertures 644 in the flange of the nozzle 621. The base liquid and the liquid ingredient are combined as unmixed flows at a bottom of the cartridge.

In the embodiment shown, the nozzle 621 is instrumental in combining the flows of liquid ingredient with the flow of base liquid. The liquid ingredient dispensing apertures 644 of the nozzle 621 are positioned adjacent an inner wall of the nozzle that defines the channel 623 of the nozzle 621 through which the base liquid is to be dispensed, such that the flows of liquid ingredient are dispensed adjacent the flow of base liquid. The flows of liquid ingredient preferably are dispensed such that they adhere to the flow of base liquid. The liquid ingredient and the base liquid are mixed when the flows hit a container, e.g. a drinking glass, for holding the beverage. Thus, the turbulence created in the container by the flows being dispensed is used for mixing the flows. Compared with traditional set ups, in which a base liquid and liquid ingredient are typically mixed in a mixing chamber prior to being dispensed, a cartridge according to the invention allows for mixing a base liquid and a liquid ingredient with a minimum of turbulence in the flows. This is in particular beneficial when dispensing beverages comprising carbonated water. Because of the reduced turbulence during the dispensing process, less CO2 is separated from the water, and a beverage comprising a comparatively large CO2 content can be obtained.

In the exemplary embodiment shown in FIGS. 31-36, the cartridge 601 is configured such that movement of the top end of the column 615 opens the sealed capsule 602. The combination of a capsule body 605 with a nozzle 621, the capsule being sealed with a top seal 620 and a bottom seal 628, allows for the capsule body to have a simple shape.

The capsule body having a simple shape allows for the capsule body, and thus for the walls of the capsule body, to be a multi-layer material. Furthermore, the simple shape of the capsule body is suitable for being provided by way of thermoforming. Thermoforming allows for using laminated materials, and thus provide a capsule body having improved barrier properties against low costs.

As such, the cartridge is configured to provide a capsule, more in particular a sealed reservoir, for holding an ingredient, which capsule has barrier properties fit the particular base ingredient to be held in the reservoir.

It is submitted that in the embodiment shown in FIGS. 31-36, the sealed capsule 602 is provided with a diamond shaped bottom seal 628. In such an embodiment, the capsule body 605 is provided with two outflow openings 644 in its bottom wall 610, which outflow openings are provided on opposite sides of the column 615.

In the depicted embodiment, the diamond shaped bottom seal 628 has a central opening, through which a bottom end of the nozzle 621 protrudes. The bottom seals 628 is at its circumference sealed to the bottom of the capsule body 605, and along its central opening to a flange 629 of the nozzle 621. The bottom seal 628 is furthermore sealed to the bottom wall 610 of the capsule body 605 around the outflow apertures 619A of the reservoir 611.

In the preferred embodiment shown in FIGS. 31-36, the bottom of the capsule body 605 is provided with an annular shaped shoulder. The bottom seal 628 is sealed along its periphery to the annular shaped shoulder. The nozzle is provided with an annular flange. The bottom seal 628 is fixed along its centre opening to the flange.

In the embodiments shown, the capsule is opened by pushing part of the nozzle comprising the flange out of the column of the capsule body. The nozzle thus pulls the centre of the bottom seal away from the bottom wall of the capsule body, which causes the bottom seal to be pulled away from the outflow apertures of the reservoir. Thus, the sealed capsule is opened.

Subsequently, the bottom seal, still being fixed at its peripheral edge to the bottom of the capsule, and along its central opening to the nozzle, functions as a guide for the liquid ingredient being dispensed from the reservoir. The seal guides the liquid ingredient to the outlet opening of the nozzle, i.e. the opening at which the base liquid is dispensed, such that the liquid ingredient can be dispensed parallel and adjacent to the flow of base liquid.

It is submitted that the diamond shape of the seal, in combination with the two outflow openings of the reservoir, makes that the seal forms an optimal guide for the liquid ingredient. The diamond shape causes the seal to form to guide channels, directed from below the reservoir outflow apertures towards the nozzle. The surface of the seal is slanted towards the centre of the guide channels and towards the nozzle. Thus, all liquid ingredient is guided towards the dispense opening, and the risk of liquid ingredient remaining in the guide channel, i.e. not being dispensed, is reduced.

In a preferred embodiment, the capsule body is a made out of a multi-layer material, preferably is thermoformed out of a sheet of multi-layer material, such that the walls of the capsule comprises multiple layers of different materials, the materials having different barrier properties.

The invention claimed is:

1. A cartridge for providing beverage, the cartridge comprising:

a sealed capsule filled with a portion of a liquid ingredient to be combined with a base liquid for the preparation of the beverage;

a nozzle for dispensing a flow of base liquid at a bottom side of the capsule;

a top seal; and a bottom seal, wherein the sealed capsule comprises a capsule body with a bottom and a top, the capsule body comprising an outer circumferential wall and an inner circumferential wall which are connected to each other via a bottom wall, and wherein the inner circumferential wall, the bottom wall and the outer circumferential wall delimit an annular reservoir between them, wherein the inner circumferential wall forms a central column, the column having an internal cavity that extends between an upper opening at a top of the column and a bottom opening at a bottom end of the column, wherein the column is a compressible column, and wherein the annular reservoir extends around the central column, wherein the inner circumferential wall is at a top end provided with an inner sealing surface and the outer circumferential wall is at a top end provided with an outer sealing surface, the inner sealing surface and the outer sealing surfaces delimiting an annular reservoir access opening between them, wherein the top seal covers the annular reservoir access opening, with an inner section of the top seal sealed to the inner sealing surface at the top end of the inner circumferential wall and with an outer section of the top seal sealed to the outer sealing surface at the top end of the outer circumferential wall, the top seal hermetically sealing the reservoir access opening, wherein the bottom wall of the capsule body is provided with at least one reservoir outlet in the form of a reservoir outlet aperture, wherein the at least one reservoir outlet aperture is spaced from the bottom opening of the central column in a radial direction, wherein the capsule body is, on a bottom surface of the bottom wall, provided with an aperture sealing surface for the at least one reservoir outlet aperture, the reservoir outlet aperture sealing surface encircling the at least one reservoir outlet aperture, wherein the capsule body is on the bottom surface of the bottom wall, furthermore provided with a peripheral sealing surface encircling the bottom opening of the central column, the reservoir outlet aperture and the reservoir outlet aperture sealing surface, wherein the reservoir outlet aperture sealing surface is located between the peripheral sealing surface and the bottom opening of the central column;

wherein the nozzle is received in the internal cavity of the column and is moveable, relative to the outer circumferential wall of the capsule body, from a raised passive position into a lowered dispensing position, wherein the nozzle comprises a nozzle body having a channel for guiding the flow of base liquid through at least part of the cavity, the channel extending between a channel inlet opening at a top end of the nozzle and a channel outlet opening at a bottom end of the nozzle, wherein the nozzle body furthermore has a flange at the bottom end, the flange having a sealing surface for the bottom seal and having at least one dispensing aperture, the dispensing aperture penetrating the flange near or at the channel outlet opening, for dispensing liquid ingredient at or adjacent the flow of base liquid exiting the channel outlet opening, wherein the bottom seal, with an outer section, is sealed to the peripheral sealing surface and, with an inner section, is sealed to the sealing surface of the nozzle, and, with a middle section that is located between the inner section and the outer section, is sealed to the reservoir outlet aperture sealing surface, hermetically sealing the reservoir outlet, wherein, when the nozzle is moved into the dispensing position by compressing the column, the nozzle pulls the bottom seal away from reservoir outlet sealing surface and from the reservoir outlet aperture in the bottom wall of the capsule, enabling liquid ingredient to flow out of the reservoir, while the bottom seal remains, with the outer section, attached to the peripheral sealing surface and, with the inner section, attached to the sealing surface of the nozzle, and wherein, when the nozzle is in the dispensing position, the bottom seal forms a guide surface below the reservoir outlet aperture enabling the liquid ingredient to flow along the bottom seal in a radially inward direction from the reservoir outlet aperture in the bottom wall of the capsule towards the dispensing aperture of the nozzle.

2. Cartridge according to claim 1, wherein the capsule body is a made out of a multi-layer material, such that the walls of the capsule comprises multiple layers of different materials, the different materials having different barrier properties.

3. Cartridge according to claim 1, wherein the top seal and/or the bottom seal are/is a sealing film.

4. Cartridge according to claim 1, wherein the top seal is a sealing film, which top sealing film is provided with one or more premade score lines.

5. Cartridge according to claim 1, wherein the bottom seal is a sealing film, and the one or more reservoir outlets are initially sealed by the bottom sealing film of the cartridge, and wherein the motion of the column to a lower dispensing position thereof causes the bottom sealing film of the cartridge to form a guide surface for guiding liquid ingredient dispensed from the one or more reservoir outlets initially sealed by said bottom sealing film towards the nozzle, and thereby to enable the dispensing of the liquid ingredient from the cartridge via the nozzle.

6. Cartridge according to claim 1, wherein the bottom seal is a diamond or oval shaped bottom seal, and the capsule body is provided with two reservoir outlet apertures in its bottom wall, which reservoir outlet apertures are provided on opposite sides of the column, wherein the oval or diamond shaped bottom seal has a longitudinal axis and a shorter cross axis, and wherein the reservoir outlet apertures are located above the longitudinal axis.

7. Cartridge according to claim 1, wherein the bottom seal has a central opening, through which the bottom end of the nozzle protrudes, and wherein the bottom seal is at its circumference sealed to the bottom of the capsule body, and along the central opening of the seal is sealed to a flange of the nozzle.

8. Cartridge according to claim 1, wherein the column of the capsule body is provided with a buckling portion, i.e. a local area of the column that is configured to buckle when a pressure is exerted on the top of the column.

9. Cartridge according to claim 1, wherein a lower portion of the column is provided with a reinforcing structure, which reinforcement structure comprises linear ribs that extend in a direction parallel to a longitudinal axis of the column, when seen in side view.

10. System for the preparation of a liquid food product, which system comprises:

a) a cartridge according to claim 1;

b) a dispensing apparatus, the apparatus comprising:

a holder adapted to accommodate and retain the cartridge at a dispensing location in the apparatus, a base liquid feed assembly with a base liquid feed member disposed at the dispensing location, which base liquid feed 2member is embodied to connect to the channel of the nozzle received in the column of the cartridge, so that base liquid can be fed into the channel, an operable displacement device which is adapted to produce a movement of the holder for the cartridge and the base liquid feed member relative to each other in order to connect the base liquid feed member to the channel and to move the top of the column and the nozzle down from the raised passive position to said lowered dispensing position, a pressurized gas source, wherein the dispensing apparatus is adapted to bring said pressurized gas source in direct communication with the reservoir of the capsule so as to allow said liquid ingredient therein to be pressurized by said gas thereby assisting the dispensing thereof from the reservoir via said one or more reservoir outlet, wherein the system is adapted to create one or more gas pressure introduction openings in the top sealing film that covers the reservoir access opening, the dispensing apparatus further comprising a pressurization dome member having a peripheral gas seal along a periphery thereof an outer gas seal, which is adapted to sealingly engage the cartridge around a location where said one or more openings are created in said top sealing film to allow entry of said pressurized gas into the reservoir, the pressurized gas source being connected to said dome member and adapted to feed pressurized gas beneath said dome member within the contour of the peripheral gas seal sealingly engaging the cartridge, so as to allow said liquid ingredient in said reservoir to be pressurized by said gas via the one or more gas pressure introduction openings in said sealing film, thereby assisting the dispensing of the liquid ingredient from the reservoir via said at least one reservoir outlet, wherein the cartridge is configured such that, moving at least the top of the column downward, causes the top sealing film to be locally overstressed and thereby to be ruptured and provide said one or more gas pressure introduction openings.

11. System according to claim 10, wherein the outer circumferential wall of the capsule body is provided with a flange, said flange forming a peripheral top portion of the capsule body, said top seal being adhered to said flange at said outer seal area.

12. System according to claim 10, wherein the base liquid feed member is a base liquid feed lance which protrudes from the pressurization dome member.

13. System according to claim 10, wherein the at least one reservoir outlet of the cartridge is arranged at said bottom side of the cartridge and spaced from the column so that liquid ingredient emerges from said one or more reservoir outlets as a flow or flows distinct from the stream of base liquid emerging from the nozzle, and wherein a guide member is provided so that liquid ingredient emerging from the reservoir outlets adjoins the outside of the base liquid stream that has emerged from the nozzle.

14. System according to claim 13, wherein the at least one reservoir outlet of the cartridge is arranged at a height above the channel outlet opening of the nozzle, when the nozzle is in the lowered dispensing position.

15. System according to claim 10, wherein a guide member is provided so that the liquid ingredient emerging from the at least one reservoir outlet adjoins the outside of the base liquid stream that has emerged from the nozzle as an annular shroud around said base liquid stream.

16. System according to claim 15, wherein the dispensing apparatus is adapted to pressurize the liquid ingredient in the reservoir so that the one or more streams of liquid ingredient emerging from the one or more reservoir outlets flow as a slow flow along with the base liquid stream emerging from the nozzle, which slow flow adjoins the outside of the base liquid stream.

17. System according to claim 16, wherein a guide member is provided below the capsule body and below the at least one reservoir outlet, which guide member comprises a guide surface oriented at an angle relative to the flow of liquid ingredient emerging from the reservoir such that a jet of liquid ingredient emerging from the reservoir outlet due to the gas pressurization of the liquid ingredient collides against the guide surface of the guide member thereby reducing the speed of said jet.

18. System according to any of claim 10, wherein the holder is a drawer comprising a cavity for receiving the cartridge therein, which drawer is movable into a housing of the apparatus so that the cartridge is movable into the dispensing location, and wherein the operable displacement device is adapted to move the pressurization dome member up and down relative to housing so as to sealingly engage—in a lower position of the dome member—the peripheral gas seal with the cartridge around a location where the sealing film is opened to allow entry of pressurized gas into the reservoir.

19. Cartridge according to claim 8, wherein the buckling portion comprises at least one annular band of parallelogram shaped recesses, which recess are separated by linear ridges.

20. A method for the preparation of a liquid food product, wherein use is made of a system according to claim 10, wherein the method comprises:

sealingly engaging the peripheral gas seal of the pressurization dome member with the cartridge around a location where the top sealing film is or will be opened to allow entry of pressurized gas into the reservoir, causing the top sealing film to open at said one or more locations, causing the at least one reservoir outlet to open by pushing down the top end of the column of the cartridge, feeding pressurized gas beneath said dome member thereby pressurizing the liquid ingredient in the reservoir of the capsule by said gas thereby assisting the dispensing thereof from the reservoir via said one or more reservoir outlets.

21. A cartridge for providing a beverage, the cartridge comprising:

a sealed capsule filled with a portion of a liquid ingredient to be combined with a base liquid for the preparation of the beverage, wherein the sealed capsule comprises a capsule body with a bottom and a top, the capsule body comprising an outer circumferential wall, an inner circumferential wall and a bottom wall, the walls delimiting an annular reservoir between them, wherein the inner circumferential wall and the outer circumferential wall at a top end are respectively provided with an inner sealing surface and an outer sealing surface, the sealing surfaces delimiting a reservoir access opening between them, wherein the inner circumferential wall forms a central column, the annular reservoir extending around the central column, the central column having an internal cavity that extends between an upper opening at a top of the column and a bottom opening at a bottom end of the column, wherein the column is a compressible column, and wherein the bottom wall of the capsule body is provided with at least two reservoir outlets, each in the form of a reservoir outlet aperture, wherein the at least two reservoir outlet apertures are each provided in a section of the bottom wall that extends between the outer circumferential wall and the inner circumferential wall, and are each spaced from the bottom opening of the central column in a radially outward direction, wherein the capsule body is, on a bottom surface of the bottom wall, provided with an aperture sealing surface for each reservoir outlet aperture, the aperture sealing surface encircling the respective reservoir outlet aperture, wherein the capsule body is, on the bottom surface of the bottom wall, provided with a peripheral sealing surface, the peripheral sealing surface encircling the bottom opening of the central column and the reservoir outlet aperture sealing surfaces, wherein the reservoir outlet aperture sealing surfaces are located between the peripheral sealing surface and the bottom opening of the central column, wherein the bottom seal is releasable sealed to the aperture sealing surfaces, hermetically sealing the reservoir outlets, and is fixed to the peripheral sealing surface; and wherein a top seal is sealed to the inner sealing surface at the top end of the inner circumferential wall and the outer sealing surface at the top end of the outer circumferential wall and covers the reservoir, the top seal hermetically sealing the access opening of the reservoir, wherein the cartridge further comprises:

a nozzle for guiding a flow of base liquid through at least part of the cavity, and for dispensing the base liquid at a bottom side of the capsule, wherein the nozzle comprises:

a nozzle body having a channel extending between a channel inlet opening at a top end of the nozzle and a channel outlet opening at a bottom end of the nozzle, wherein the nozzle is moveable, relative to the outer circumferential wall of the capsule body, from a raised passive position into a lowered dispensing position, wherein the nozzle furthermore has a flange at the bottom end, the flange having a sealing surface for the bottom seal and having at least one dispensing aperture, the dispensing aperture penetrating the flange near or at the channel outlet opening, for dispensing liquid ingredient at or adjacent the flow of base liquid exiting the channel outlet opening, wherein the bottom seal is fixed to the sealing surface of the nozzle, and, when the nozzle is moved into the dispensing position by compressing the column, the nozzle pulls the bottom seal away from the at least two reservoir outlet apertures in the bottom wall of the capsule, enabling liquid ingredient to flow out of the reservoir via the at least two reservoir outlets, and wherein the bottom seal, when the nozzle is moved into the dispensing position by compressing the column, remains attached to the peripheral sealing surface of the bottom of the capsule and to the sealing surface of the nozzle, to form a guide surface enabling the liquid ingredient to flow in a radially inward direction along the bottom seal from the aperture in the bottom of the capsule towards the dispensing aperture of the nozzle, when the nozzle is in the dispensing position.

* * * * *